US012476469B2

(12) United States Patent
Tahata et al.

(10) Patent No.: US 12,476,469 B2
(45) Date of Patent: Nov. 18, 2025

(54) ELECTRIC POWER CONTROL SYSTEM SIMULATING A SYNCHRONOUS GENERATOR

(71) Applicant: Mitsubishi Electric Corporation, Tokyo (JP)

(72) Inventors: Kazuyori Tahata, Tokyo (JP); Yoshiyuki Kono, Tokyo (JP); Shuhei Fujiwara, Tokyo (JP); Shinji Tominaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 18/261,927

(22) PCT Filed: Feb. 5, 2021

(86) PCT No.: PCT/JP2021/004413
§ 371 (c)(1),
(2) Date: Jul. 18, 2023

(87) PCT Pub. No.: WO2022/168283
PCT Pub. Date: Aug. 11, 2022

(65) Prior Publication Data
US 2024/0088673 A1    Mar. 14, 2024

(51) Int. Cl.
*H02J 3/46*    (2006.01)
*H02J 3/48*    (2006.01)

(52) U.S. Cl.
CPC . *H02J 3/46* (2013.01); *H02J 3/48* (2013.01)

(58) Field of Classification Search
CPC ..................................... H02J 3/46; H02J 3/48
See application file for complete search history.

(56) References Cited

U.S. PATENT DOCUMENTS

| | | | |
|---|---|---|---|
| 2016/0134201 A1* | 5/2016 | Lu | H02M 7/493 363/71 |
| 2019/0334352 A1 | 10/2019 | Sugimoto et al. | |
| 2020/0083709 A1 | 3/2020 | Umezu et al. | |

FOREIGN PATENT DOCUMENTS

| | | | | |
|---|---|---|---|---|
| CN | 111865122 A | * | 10/2020 | ............ H02J 3/1864 |
| DE | 102019116254 A1 | * | 12/2020 | ................ H02J 3/10 |

(Continued)

OTHER PUBLICATIONS

Machine translation of DE102019116254A1 by Clarivate Anayltics, Apr. 2025, 17 pages.*

(Continued)

*Primary Examiner* — Harry R Behm
(74) *Attorney, Agent, or Firm* — Buchanan Ingersoll & Rooney PC

(57) ABSTRACT

An electric power control system includes a plurality of power converters connected in parallel. Each power converter, among the plurality of power converters, converts a direct-current power of an electricity storage device connected to the power converter into an alternating-current power, and outputs the alternating-current power to the power system. The electric power control system further includes: a power generator simulation unit to simulate characteristics of the synchronous generator based on an aggregate active power to generate a phase of the alternating-current voltage; a signal generation unit to generate a control signal for the power converter, based on the phase of the alternating-current voltage. The power generator simulation unit generates a first angular frequency based on a first difference between the aggregate active power and a target value for the aggregate active power, and generates, based on the first angular frequency, the phase of the alternating-current voltage.

20 Claims, 18 Drawing Sheets

(56) References Cited

FOREIGN PATENT DOCUMENTS

| EP | 3780310 A1 | 2/2021 |
|---|---|---|
| JP | 2016025746 A | 2/2016 |
| JP | 2018107959 A | 7/2018 |
| JP | 2018107991 A | 7/2018 |
| JP | 2019154219 A | 9/2019 |
| JP | 2019176584 A | 10/2019 |

OTHER PUBLICATIONS

Machine translation of CN 111865122A by Clarivate Anayltics, Apr. 2025, 14 pages.*
International Search Report (PCT/ISA/210) with translation and Written Opinion (PCT/ISA/237) mailed on Apr. 27, 2021 by the Japanese Patent Office as the International Searching Authority for International Application No. PCT/JP2021/004413. (9 pages).

* cited by examiner

ELECTRIC POWER CONTROL SYSTEM SIMULATING A SYNCHRONOUS GENERATOR

TECHNICAL FIELD

The present disclosure relates to an electric power control system.

BACKGROUND ART

In a facility for stabilizing the frequency of a power system, the discharge energy of a large capacitor disposed on the direct current (DC) side is converted into an alternating-current (AC) power by a power converter, and the AC power is thereby discharged to an alternating-current system. The AC power in the power system, in contrast, is converted into DC power by a power converter, and the DC power is thereby absorbed into a large capacitor, as a charge energy. The large capacitor is, for example, an electrical double layer capacitor (EDLC), also referred to as a super capacitor or an ultra-capacitor.

The functionality similar to the above facility can also be achieved in a secondary battery power storage system referred to as a battery energy storage system (BESS). Specifically, the discharge energy of a storage battery on the DC side is discharged to the alternating-current system via a power converter, and the AC power of the alternating-current system is absorbed, as a charge energy, into a storage battery via a power converter.

The stabilized frequency of the power system, the load leveling, etc. are expected by interconnecting the electricity storage device on the DC side to the alternating-current system via power converter and using the stored direct-current energy in such a manner. In order to implement this, a technique is proposed in recent years which causes the power converter to operate as a virtual synchronous generator.

For example, Japanese Patent Laying-Open No. 2018-107991 (PTL 1) discloses causing a power storage facility, comprising an electricity storage device and a power converter, to operate as a virtual generator, while maintaining the electrical storage capacity.

CITATION LIST

Patent Literature

PTL 1: Japanese Patent Laying-Open No. 2018-107991

SUMMARY OF INVENTION

Technical Problem

PTL 1 discloses multiple power storage facilities, including an electricity storage device and a power converter, being connected in parallel. In such a configuration, if each power storage facility is caused to operate as a virtual synchronous generator, each power storage facility operate as a separate virtual synchronous generator. Consequently, the power storage facilities do not coordinate together, which may make the operation of the system, as a whole, unstable.

An object of the present disclosure according to a certain aspect is to provide an electric power control system which can achieve stable operation of the system as a whole even when the power converter, included in each of multiple power storage facilities connected in parallel, is controlled, simulating a synchronous generator.

Solution to Problem

An electric power control system according to a certain embodiment includes a plurality of power converters connected in parallel. Each power converter, among the plurality of power converters, converts a direct-current power of an electricity storage device connected to the power converter into an alternating-current power, and outputs the alternating-current power to a power system via a converter transformer. The electric power control system further includes: a power generator simulation unit to simulate characteristics of a synchronous generator based on an aggregate active power to generate a phase for an alternating-current voltage output from the power converter, the aggregate active power being a total sum of active powers output from the plurality of power converters; and a signal generation unit to generate a control signal for the power converter based on the phase of the alternating-current voltage for the power converter generated by the power generator simulation unit. The power generator simulation unit generates a first angular frequency based on a first difference between the aggregate active power and a target value of the aggregate active power, and generates the phase of the alternating-current voltage output from the power converter based on the first angular frequency.

An electric power control system according to another embodiment includes a plurality of power converters connected in parallel. Each power converter, among the plurality of power converters, converts a direct-current power of an electricity storage device connected to the power converter into an alternating-current power, and outputs the alternating-current power to a power system via a converter transformer. The electric power control system further includes: a power generator simulation unit to simulate characteristics of a synchronous generator, based on an active power output from the power converter, to generate a phase for an alternating-current voltage output from the power converter, and a signal generation unit to generate a control signal for the power converter based on the phase of the alternating-current voltage for the power converter generated by the power generator simulation unit. The power generator simulation unit calculates a parameter for use in generating the phase of the alternating-current voltage output from the power converter, and generates the phase of the alternating-current voltage output from the power converter, based on a parameter corresponding to the power converter and an average of parameters of the plurality of power converters.

Advantageous Effects of Invention

According to the present disclosure, stable operation of a system as a whole can be achieved even when a power converter, included in each of multiple power storage facilities connected in parallel control, is controlled, simulating a synchronous generator.

DESCRIPTION OF EMBODIMENTS

Hereinafter, the present embodiment will be described, with reference to the accompanying drawings. In the following description, like reference signs refer to like parts. Their names and functionalities are also the same. Thus, detailed description thereof will not be repeated.

Embodiment 1

<Overall Configuration>

Figure 1:
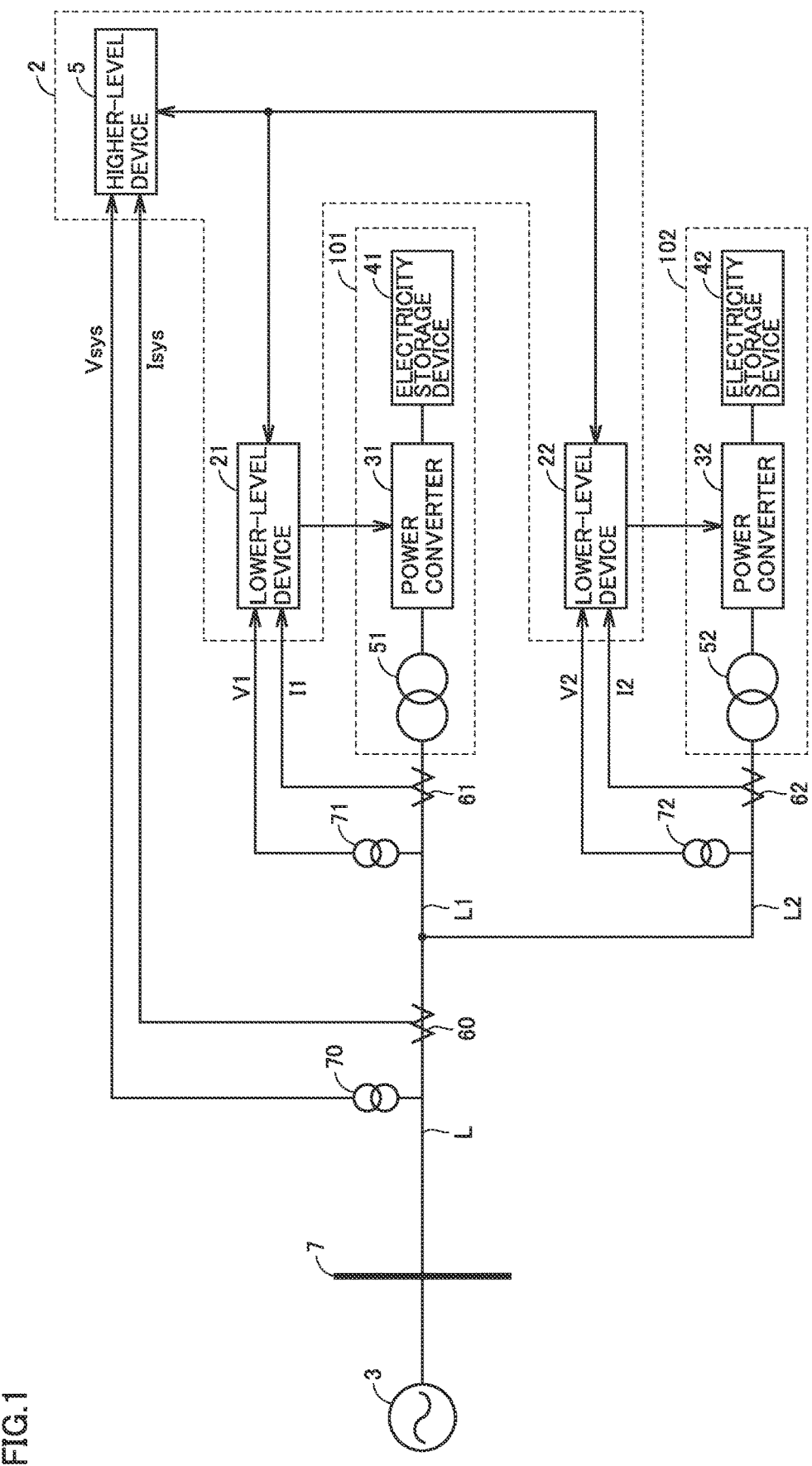
FIG. 1 is a diagram for illustrating one example of an overall configuration of an electric power control system.

FIG. 1 is a diagram for illustrating one example of an overall configuration of an electric power control system. Referring to FIG. 1, the electric power control system includes a control device 2, a power system 3, and power storage facilities 101 and 102. The power system 3 is an alternating-current system that has three phases, for example. A line L is branched into lines L1 and L2. A current detector 60 and a voltage detector 70 are disposed on the line L. A current detector 61 and a voltage detector 71 are disposed on the line L1. A current detector 62 and a voltage detector 72 are disposed on the line L2.

The electric power control system according to the present embodiment includes multiple power storage facilities 101 and 102 connected in parallel. The power storage facilities 101 and 102 are connected to a point of common coupling (PCC) 7 of the power system 3. For ease of description, an electric power control system having two power storage facilities is described herein. However, the electric power control system may have three or more power storage facilities.

The power storage facility 101 includes a power converter 31, an electricity storage device 41, and a converter transformer 51. The power converter 31 has the electricity storage device 41 connected to the DC side and the converter transformer 51 connected to the AC side. The power converter 31 converts DC power of the electricity storage device 41 into AC power, and outputs the AC power to the power system 3 via the converter transformer 51. The power converter 31 also converts AC power received from the power system 3 via the line L1 into DC power, and outputs the DC power to the electricity storage device 41. This causes the electricity storage device 41 to be charged.

The power storage facility 102 includes a power converter 32, an electricity storage device 42, and a converter transformer 52. The power converter 32, the electricity storage device 42, and the converter transformer 52 have the same function as the power converter 31, the electricity storage device 41, and the converter transformer 51, respectively. Typically, the power converter 32 converts DC power of the electricity storage device 42 into AC power, and outputs the AC power to the power system 3 via the converter transformer 52. The power converter 32 also converts AC power received from the power system 3 via the line L2 into DC power, and outputs the DC power to the electricity storage device 42.

As shown in FIG. 1, since the power converters 31 and 32 are connected in parallel, the aggregate power, which is a total sum of the AC powers from the power converters 31 and 32, is output to the PCC 7 of the power system 3. For example, the power converters 31 and 32 are self-excited converters, such as a 2-level converter, 3-level converter, or a modular multilevel converter. In Embodiment 1, the power converters 31 and 32 have the same or about the same capacity. For example, suppose that the capacity of the power converter 31 is "SM1," the capacity of the power converter 32 is "SM2," and the reference capacity is "SM." In this case, if the difference between each of the capacity SM1 and the capacity SM2 and the reference capacity SM is less than or equal to a certain percentage (e.g., 10%), the capacity SM1 and the capacity SM2 are about the same. Specifically, where $-0.1 \leq 1-(SM1/SM) \leq 0.1$ and $-0.1 \leq 1-(SM2/SM) \leq 0.1$, the capacity SM1 and the capacity SM2 are about the same. The electricity storage devices 41 and 42, while they are, for example, electrical double layer capacitors, may be secondary batteries.

The control device 2 is a device for controlling the power converters 31 and 32. The control device 2 includes a higher-level device 5 and lower-level devices 21 and 22. The higher-level device 5 and the lower-level devices 21 and 22 are capable of communications with each other. The lower-level devices 21 and 22 are provided in one-to-one correspondence with the power converters 31 and 32, respectively.

The current detector 61 detects a three-phase AC current I1 on the line L1. The AC current I1 is input to the lower-level device 21. The current detector 62 detects a three-phase AC current I2 on the line L2. The AC current I2 is input to the lower-level device 22. The current detector 60 detects a three-phase AC current Isys (i.e., AC current at the PCC 7) on the line L. The AC current Isys is input to the higher-level device 5.

The voltage detector 71 detects a three-phase AC voltage V1 on the line L1. The AC voltage V1 is input to the lower-level device 21. The voltage detector 72 detects a three-phase AC voltage V2 on the line L2. The AC voltage V2 is input to the lower-level device 22. The voltage detector 70 detects a three-phase AC voltage Vsys (i.e., AC voltage at the PCC 7) on the line L. The AC voltage Vsys is input to the higher-level device 5.

The higher-level device 5 and the lower-level devices 21 and 22 operate together to control the respective operations of the power converters 31 and 32. Specifically, the operation of the power converter 31 is controlled by the functions of the higher-level device 5 and the lower-level device 21, and the operation of the power converter 32 is controlled by the functions of the higher-level device 5 and the lower-level device 22. The functions and processes performed by the higher-level device 5 and the lower-level devices 21 and 22 will be described below in detail.

<Hardware Configuration>

Figure 2:
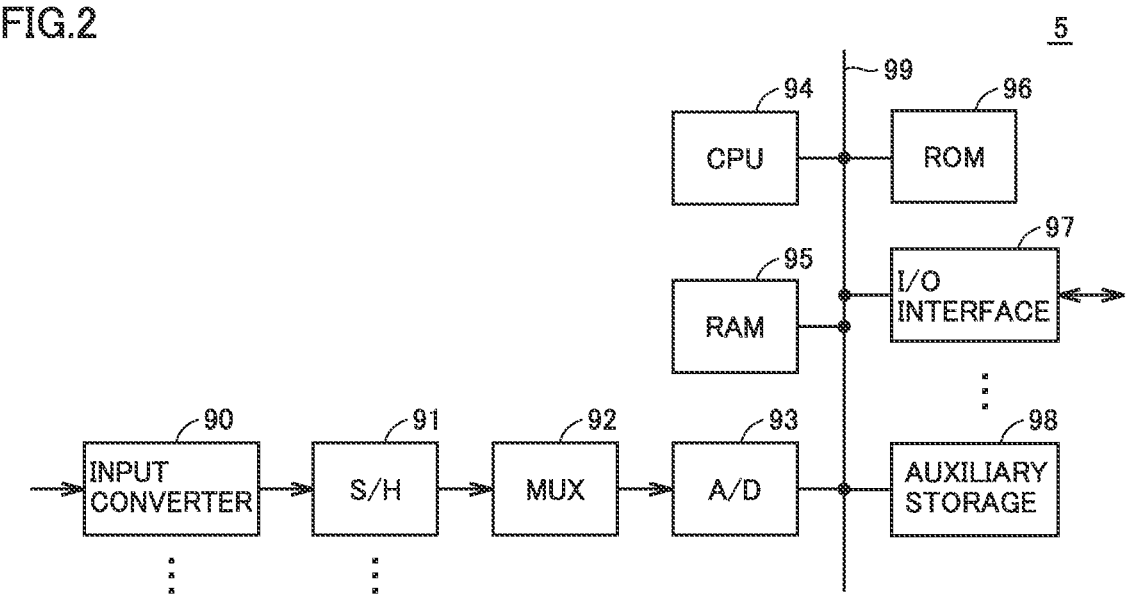
FIG. 2 is a block diagram showing one example of a hardware configuration of a higher-level device.

FIG. 2 is a block diagram showing one example of a hardware configuration of the higher-level device 5. FIG. 2 illustrates an example in which the higher-level device 5 is configured of a computer.

Referring to FIG. 2, the higher-level device 5 includes one or more input converters 90, one or more sample and hold (S/H) circuits 91, a multiplexer (MUX) 92, an analog-to-digital converter 93, one or more central processing units (CPU) 94, a random access memory (RAM) 95, a read only memory (ROM) 96, one or more I/O interfaces 97, and an auxiliary storage 98. The higher-level device 5 also includes a bus 99 interconnecting the components.

The input converter 90 has an auxiliary transformer for each input channel. Each auxiliary transformer converts signals detected by the current detector 60 and the voltage detector 70 of FIG. 1 into signals at voltage levels suitable for the subsequent signal processing.

The sample and hold circuit 91 is provided for each input converter 90. The sample and hold circuit 91 samples and holds at a specified sampling frequency a signal representative of the electrical quantity received from a corresponding input converter 90.

The multiplexer 92 sequentially selects signals held at the sample and hold circuits 91. The analog-to-digital converter 93 converts the signals selected by the multiplexer 92 into digital values. Note that analog-to-digital conversions may be performed in parallel on signals detected by multiple input channels by providing multiple analog-to-digital converters 93.

The CPU 94 controls the entirety of the higher-level device 5, and performs computing processing in accordance with programs. The RAM 95, as a volatile memory, and the ROM 96, as a nonvolatile memory, are used as the primary memories for the CPU 94. The ROM 96 stores programs and settings values for the signal processing, etc. The auxiliary storage 98 is a larger-capacity nonvolatile memory, as compared to the ROM 96, and stores programs, and data for electrical quantity detection values, for example.

The I/O interface 97 is an interface circuit for communications between the CPU 94 and an external device.

Unlike the example of FIG. 2, it should be noted that at least part of the higher-level device 5 can be configured of circuits such as a field programmable gate array (FPGA) and an application specific integrated circuit (ASIC).

<Functional Configuration of Control Device>

Figure 3:
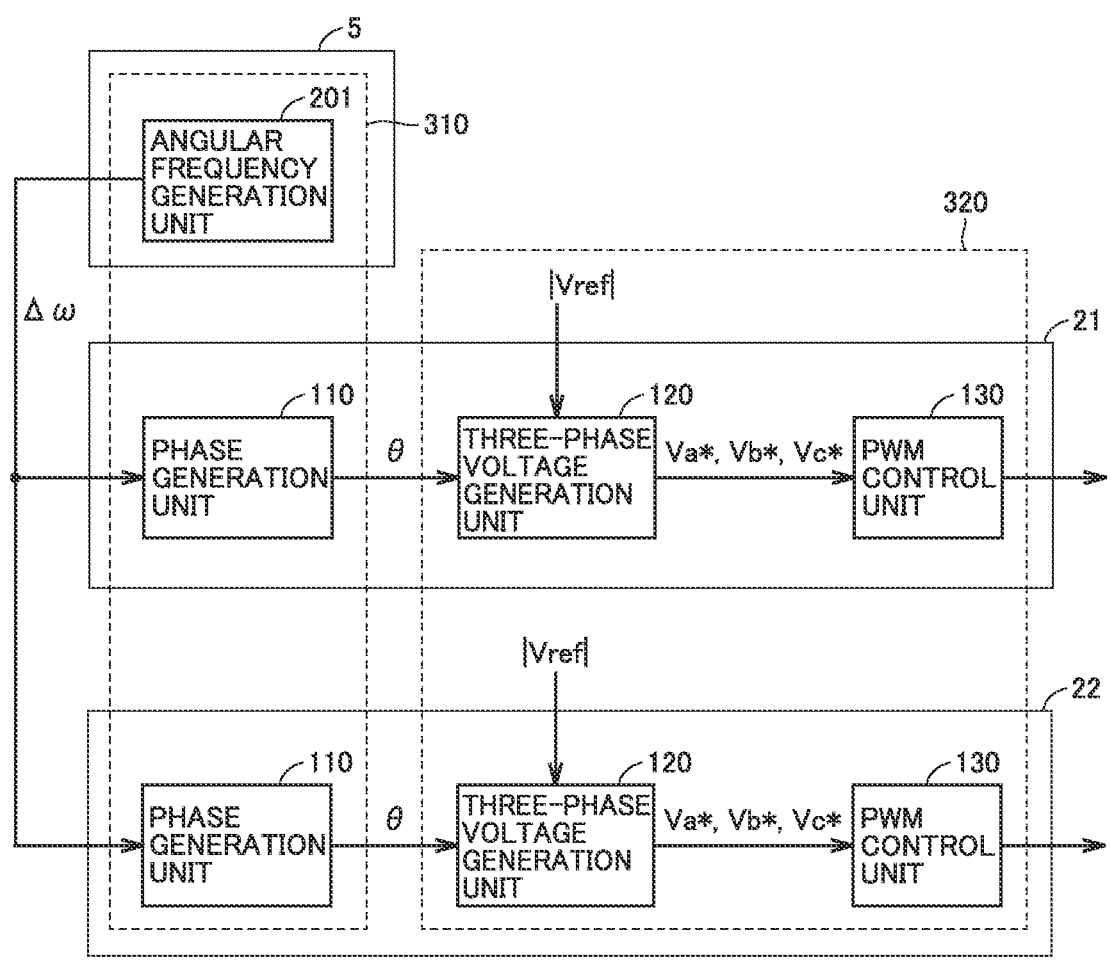
FIG. 3 is a block diagram showing one example of a functional configuration of a control device according to Embodiment 1.

FIG. 3 is a block diagram showing one example of a functional configuration of the control device 2 according to Embodiment 1. Referring to FIG. 3, the control device 2 includes, as a primary functional configuration, a power generator simulation unit 310 and a signal generation unit 320.

The power generator simulation unit 310 simulates the characteristics of the synchronous generator based on the aggregate active power, which is a total sum of the active powers output from the power converters 31 and 32, to generate the phases for the AC voltages output from the power converters 31 and 32. Specifically, the power generator simulation unit 310 includes an angular frequency generation unit 201 included in the higher-level device 5, and phase generation units 110 included in the lower-level devices 21 and 22.

Figure 4:
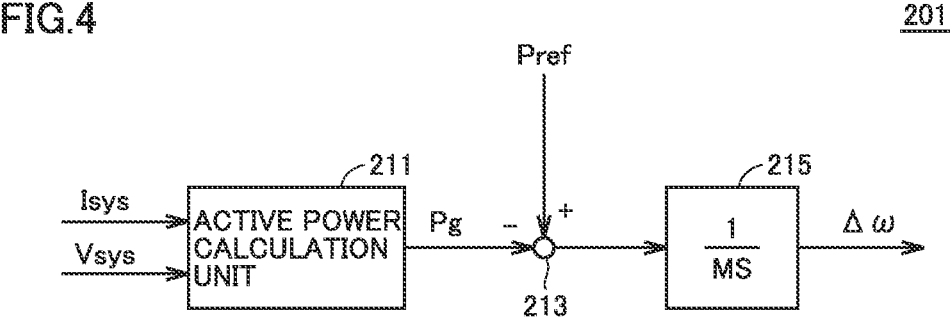
FIG. 4 is a block diagram showing one example of a functional configuration of an angular frequency generation unit according to Embodiment 1.

Based on the AC current Isys and the AC voltage Vsys, the angular frequency generation unit 201 generates an angular-frequency deviation Δω. FIG. 4 is a block diagram showing one example of a functional configuration of the angular frequency generation unit 201 according to Embodiment 1. Referring to FIG. 4, the angular frequency generation unit 201 includes an active power calculation unit 211, a subtractor 213, and an integrator (denoted as "I/MS" in the figure) 215.

Based on the AC current Isys detected by the current detector 60 and the AC voltage Vsys detected by the voltage detector 70, the active power calculation unit 211 calculates an active power Pg at the PCC 7. The active power Pg is the aggregate active power, which is a total sum of an active power P1 output from the power converter 31 and an active power P2 output from the power converter 32.

The subtractor 213 computes a difference ΔP (=Pref−Pg) between the active power Pg and an active power target value Pref which is a target value for the aggregate active power. The active power target value Pref is set, as appropriate, by a system operator.

The integrator 215 time-integrates an output value (i.e., the difference ΔP) of the subtractor 213, and outputs the angular-frequency deviation Δω. In FIG. 4, "M" in the integrator 215 is an inertial constant for a simulated generator. The angular-frequency deviation Δω, output from the integrator 215, corresponds to a difference between a reference angular frequency ω0 and an angular frequency ω of the rotor in a simulated generator. The reference angular frequency ω0 is an angular frequency of the reference frequency (e.g., 50 Hz or 60 Hz) of the power in the power system 3.

Referring, again, to FIG. 3, the phase generation unit 110 included in each of the lower-level devices 21 and 22 generates the phase θ for the AC voltage output from each of the power converters 31 and 32, based on the angular-frequency deviation Δω and the reference angular frequency ω0. Note that the phase θ corresponds to a voltage phase angle for the simulated generator.

Figure 5:
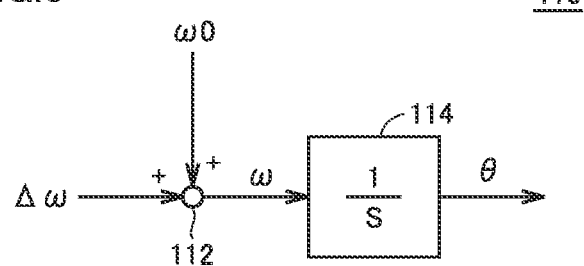
FIG. 5 is a block diagram showing one example of a functional configuration of a phase generation unit according to Embodiment 1.

FIG. 5 is a block diagram showing one example of a functional configuration of the phase generation unit 110 according to Embodiment 1. Referring to FIG. 5, the phase generation unit 110 includes an adder 112 and an integrator (denoted as "1/S" in the figure) 114. Here, the function of the phase generation unit 110 included in the lower-level device 21 is described, which is the same as the function of the phase generation unit 110 included in the lower-level device 22.

The adder 112 adds the angular-frequency deviation $\Delta\omega$ generated by the angular frequency generation unit 201 and the reference angular frequency $\omega 0$, and outputs a resultant angular frequency $\omega(=\Delta\omega+\omega 0)$. The integrator 114 time-integrates the angular frequency $\omega$, and outputs the phase $\theta$ for the AC voltage V1 output from the power converter 31. Similarly, the integrator 114 included in the lower-level device 22 outputs the phase $\theta$ for the AC voltage V2 output from the power converter 32. In other words, the integrators 114 included in the lower-level devices 22 output the same phase $\theta$.

From the foregoing, the power generator simulation unit 310 generates the angular-frequency deviation $\Delta\omega$ based on the difference $\Delta P$ between the active power Pg and the active power target value Pref and generates, based on the angular-frequency deviation $\Delta\omega$, the phases $\theta$ for the AC voltages output from the power converters 31 and 32. Specifically, the power generator simulation unit 310 time-integrates the difference $\Delta P$ to generate the angular-frequency deviation $\Delta\omega$, and time-integrates the sum of the angular-frequency deviation $\Delta\omega$ and the reference angular frequency $\omega 0$ to generate the phases $\theta$ for the AC voltages output from the power converters 31 and 32.

Referring, again, to FIG. 3, based on the phases of the AC voltages for the power converters 31 and 32, generated by the power generator simulation unit 310, the signal generation unit 320 generates control signals for the power converters 31 and 32. Specifically, the signal generation unit 320 includes three-phase voltage generation units 120 included in the lower-level devices 21 and 22, and pulse width modulation (PWM) controllers 130 included in the lower-level devices 21 and 22. Here, the functions of the three-phase voltage generation unit 120 and the PWM control unit 130 included in the lower-level device 21 are now described, which are the same as the three-phase voltage generation unit 120 and the PWM control unit 130, respectively, included in the lower-level device 22.

Based on an absolute value |Vref| and the phase $\theta$ of a target voltage Vref which is the target value of the AC voltage Vsys at the PCC 7, the three-phase voltage generation unit 120 generates three phase sinusoidal voltages Va*, Vb*, and Vc*. Specifically, the three-phase voltage generation unit 120 generates Va*=|Vref|×sin $\theta$, Vb*=|Vref|×sin $(\theta+2\pi/3)$, and Vc*=|Vref|×sin $(\theta+4\pi/3)$.

The PWM control unit 130 pulse-width modulates the three phase sinusoidal voltages Va*, Vb*, and Vc* to generate a control signal as a PWM signal. The PWM control unit 130 outputs the control signal to the power converter 31. Typically, the control signal is a gate control signal for controlling on and off of each switching element included in the power converter 31. The three-phase voltage generation unit 120 and the PWM control unit 130 included in the lower-level device 22 perform the same processing and output a control signal to the power converter 32.

Note that the functions of the higher-level device 5 and the lower-level devices 21 and 22 are implemented by processing circuits provided in the respective devices. The processing circuit may be dedicated hardware or CPU for executing programs stored in an internal memory of each device. If the processing circuit is dedicated hardware, the processing circuit is configured of FPGA, ASIC, or a combination thereof, for example.

According to the configuration of FIG. 3, a common angular-frequency deviation $\Delta\omega$ is input from the higher-level device 5 to the lower-level devices 21 and 22. Since the lower-level devices 21 and 22 have the same control scheme, the lower-level devices 21 and 22 output the same control signal. Therefore, the active power P1 output from the power converter 31 and the active power P2 output from the power converter 32 are the same. Owing to this, the entirety of the power storage facilities 101 and 102 can be regarded as one virtual generator, rather than virtual generators independent of each other. Accordingly, the stability of operation is improved, as compared to the power storage facilities 101 and 102 individually operating as virtual generators. For example, a phenomenon (i.e., cross flow) can be prevented that the output power flows in between the power storage facilities connected in parallel.

(Variation 1)

Even though the power storage facilities 101 and 102 are regarded and operate as one virtual generator, the electricity storage devices included in the power storage facilities 101 and 102 differ from each other, which may result in variations in state of charge (SOC) (%) of the electricity storage devices 41 and 42, caused by operating conditions, etc. The SOC is represented by a percentage (0 to 100%) of the current remaining charge capacity to the full charge capacity. If the electricity storage devices 41 and 42 vary in SOC, the output powers of the power storage facilities 101 and 102 differ even if the common angular-frequency deviation $\Delta\omega$ is input to the lower-level devices 21 and 22 as illustrated in the configuration of FIG. 3. Consequently, the coordination between the power storage facilities 101 and 102 may become unstable. Thus, Variation 1 will be described in which a control for compensating for the output powers is exerted in accordance with the SOCs of the electricity storage devices 41 and 42.

Figure 6:
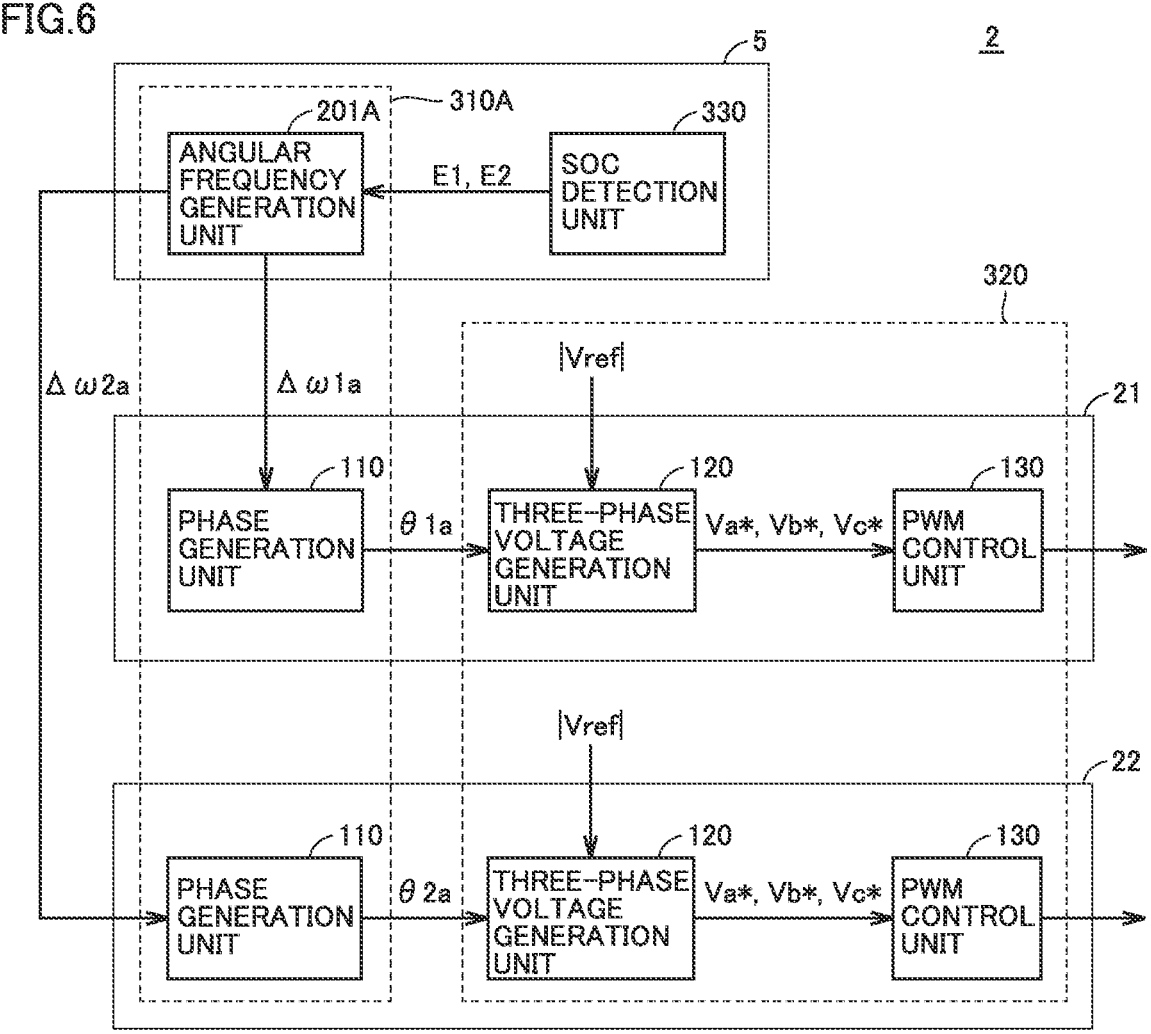
FIG. 6 is a block diagram showing one example of a functional configuration of a control device according to Variation 1 of Embodiment 1.

FIG. 6 is a block diagram showing one example of a functional configuration of the control device 2 according to Variation 1 of Embodiment 1. Referring to FIG. 6, the control device 2 includes, as a primary functional configuration, a power generator simulation unit 310A, a signal generation unit 320, and a SOC detection unit 330. The SOC detection unit 330 is included in the higher-level device 5.

The SOC detection unit 330 detects a SOC E1 of the electricity storage device 41 and a SOC E2 of the electricity storage device 42. Specifically, the SOC detection unit 330 measures the voltages of the electricity storage devices 41 and 42 to detect the SOCs E1 and E2. Alternatively, since the output voltage or output current of the electricity storage device decreases in response to the SOC, the SOC detection unit 330 detects the SOCs E1 and E2, based on the output voltages or output currents of the electricity storage devices 41 and 42.

The power generator simulation unit 310A corresponds to the power generator simulation unit 310 of FIG. 3 that includes an angular frequency generation unit 201A, instead of the angular frequency generation unit 201. Note that the phase generation unit 110 of FIG. 6 and the phase generation unit 110 of FIG. 5 have the same functional configuration.

Figure 7:
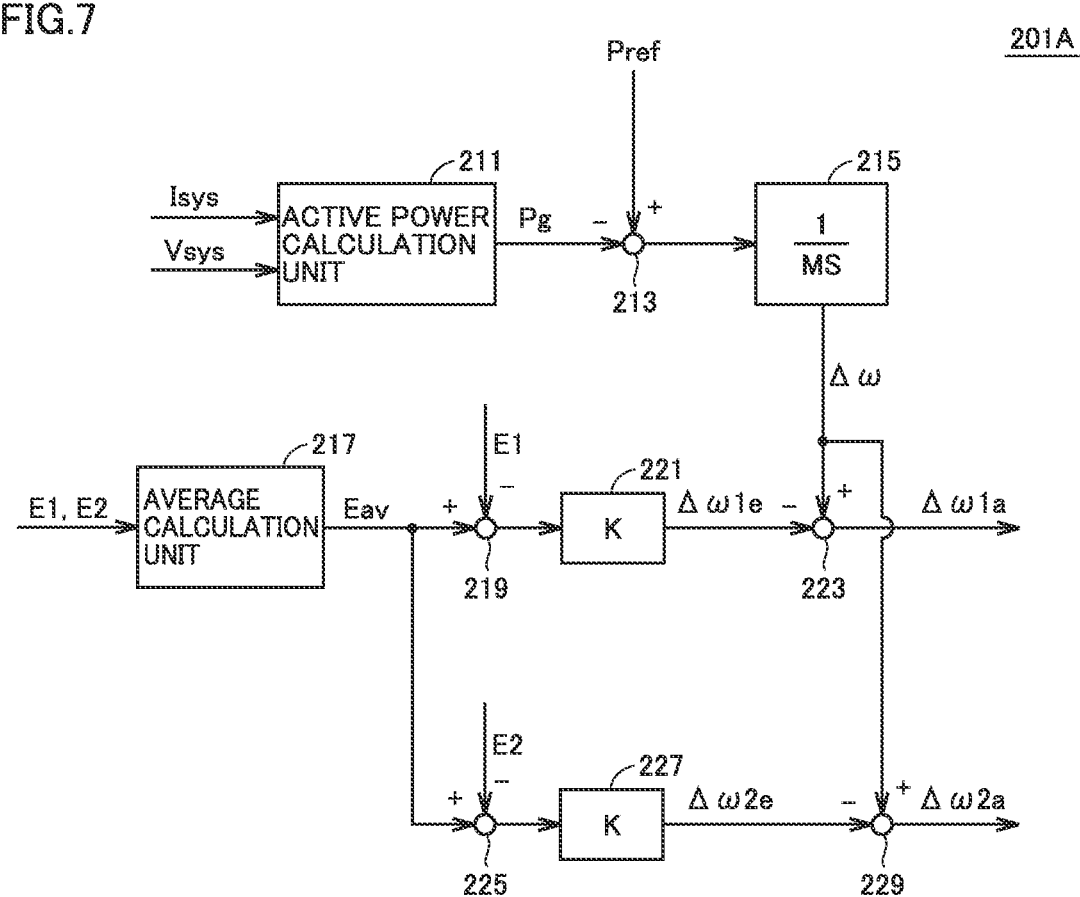
FIG. 7 is a block diagram showing one example of a functional configuration of an angular frequency generation unit according to Variation 1 of Embodiment 1.

The angular frequency generation unit 201 generates angular-frequency deviations $\Delta\omega 1a$ and $\Delta\omega 2a$. FIG. 7 is a block diagram showing one example of a functional configuration of the angular frequency generation unit 201A according to Variation 1 of Embodiment 1. Referring to FIG. 7, the angular frequency generation unit 201A is the same as the angular frequency generation unit 201 of FIG. 4, except for further including an average calculation unit 217, subtractors 219, 223, 225, and 229, and proportioners 221 and 227.

The average calculation unit 217 calculates an average Eav of the SOCs E1 and E2 detected by the SOC detection unit 330. The subtractor 219 computes a difference $\Delta E1$ (=Eav−E1) between the average Eav and the SOC E1. The proportioner 221 multiplies a gain K (provided that K>0) by the difference $\Delta E1$ and outputs a resultant multiplied value $\Delta \omega 1e$. The subtractor 223 computes an angular-frequency deviation $\Delta \omega 1a$ (=$\Delta \omega - \Delta \omega 1e$), which is a difference between the angular-frequency deviation $\Delta \omega$ and the multiplied value $\Delta \omega 1e$.

The subtractor 225 computes a difference $\Delta E2$ (=Eav−E2) between the average Eav and the SOC E2. The proportioner 227 multiplies the gain K by the difference $\Delta E2$, and outputs a resultant multiplied value $\Delta \omega 2e$. The subtractor 229 computes an angular-frequency deviation $\Delta \omega 2a$ (=$\Delta \omega - \Delta \omega 2e$), which is a difference between the angular-frequency deviation $\Delta \omega$ and the multiplied value $\Delta \omega 2e$.

As noted above, based on the angular-frequency deviation $\Delta \omega$, and the difference $\Delta E1$ between the average Eav and the SOC E1 of the electricity storage device 41 connected to the power converter 31, the angular frequency generation unit 201A generates the angular-frequency deviation $\Delta \omega 1a$ for controlling the power converter 31. Specifically, the angular frequency generation unit 201A subtracts the multiplied value $\Delta \omega 1e$, obtained by multiplying the difference $\Delta E1$ by the gain K, from the angular-frequency deviation $\Delta \omega$ to generate the angular-frequency deviation $\Delta \omega 1a$. The same goes for the method of generation of the angular-frequency deviation $\Delta \omega 2a$ for controlling the power converter 32.

Referring, again, to FIG. 6, based on the angular-frequency deviation $\Delta \omega 1a$ for controlling the power converter 31, the phase generation unit 110 included in the lower-level device 21 generates a phase $\theta 1a$ for the AC voltage output from the power converter 31. Specifically, the phase generation unit 110, included in the lower-level device 21, time-integrates the sum of the angular-frequency deviation $\Delta \omega 1a$ and the reference angular frequency $\omega 0$ to generate the phase $\theta 1a$. Similarly, the phase generation unit 110 included in the lower-level device 22 time-integrates the sum of the angular-frequency deviation $\Delta \omega 2a$ and the reference angular frequency $\omega 0$ to generate a phase $\theta 2a$.

Based on the phase $\theta 1a$ generated by the power generator simulation unit 310A, the signal generation unit 320 generates the control signal for the power converter 31. Based on the phase $\theta 2a$, the signal generation unit 320 generates the control signal for the power converter 32. The functional configuration of the signal generation unit 320 is the same as that illustrated with respect to FIG. 3, and the detailed description thereof is therefore not repeated.

According to the configuration of FIG. 6, if the SOCs of the electricity storage devices 41 and 42 vary, they can be averaged. For example, suppose that the SOC E1 of the electricity storage device 41 is less than the average Eav and the SOC E2 of the electricity storage device 42 is greater than the average Eav. In this case, the multiplied value $\Delta \omega 1e$ is a positive value, and the angular-frequency deviation $\Delta \omega 1a$ is less than the angular-frequency deviation $\Delta \omega$ (i.e., $\Delta \omega 1a < \Delta \omega$). In other words, the angular-frequency deviation $\Delta \omega$ is compensated for so that the speed of the virtual generator decreases. Meanwhile, the multiplied value $\Delta \omega 2e$ is a negative value, and the angular-frequency deviation $\Delta \omega 2a$ is greater than the angular-frequency deviation $\Delta \omega$ (i.e., $\Delta \omega 2a > \Delta \omega$). In other words, the angular-frequency deviation $\Delta \omega$ is compensated for so that the speed of the virtual generator increases. Accordingly, as compared to without the compensation for the angular-frequency deviation $\Delta \omega$, the output power from the power converter 31 reduces, which reduces the output power of the electricity storage device 41, while the output power from the power converter 32 increases, which increases the output power from the electricity storage device 42. In this way, the rate of reduction of the SOC of the electricity storage device 41 is made more moderate than the rate of reduction of the SOC of the electricity storage device 42, thereby averaging the SOCs of the electricity storage devices 41 and 42.

If the SOCs of the electricity storage devices 41 and 42 vary, the active power P1 output from the power converter 31 and the active power P2 output from the power converter 32 differ temporarily. However, the above control averages the SOCs of the electricity storage devices 41 and 42, and the variations are thereby reduced. The variations being reduced causes the active power P1 output from the power converter 31 and the active power P2 output from the power converter 32 to converge to be the same, allowing the entirety of the power storage facilities 101 and 102 to be regarded as one virtual generator, improving the stability of operation.

(Variation 2)

Even though the power storage facilities 101 and 102 are regarded and operate as one virtual generator, the converter transformers 51 and 52 included in the power storage facilities 101 and 102 differ. Due to this, the converter transformers 51 and 52 may vary in impedance because of aging, for example. In this case, the output powers of the power storage facilities 101 and 102 differ even if a common angular-frequency deviation $\Delta \omega$ is input to the lower-level devices 21 and 22 as illustrated in the configuration of FIG. 3. Consequently, the coordination between the power storage facilities 101 and 102 may become unstable. Thus, Variation 2 will be described in which a control for compensating for the output power is exerted in accordance with the impedances of the converter transformers 51 and 52.

Figure 8:
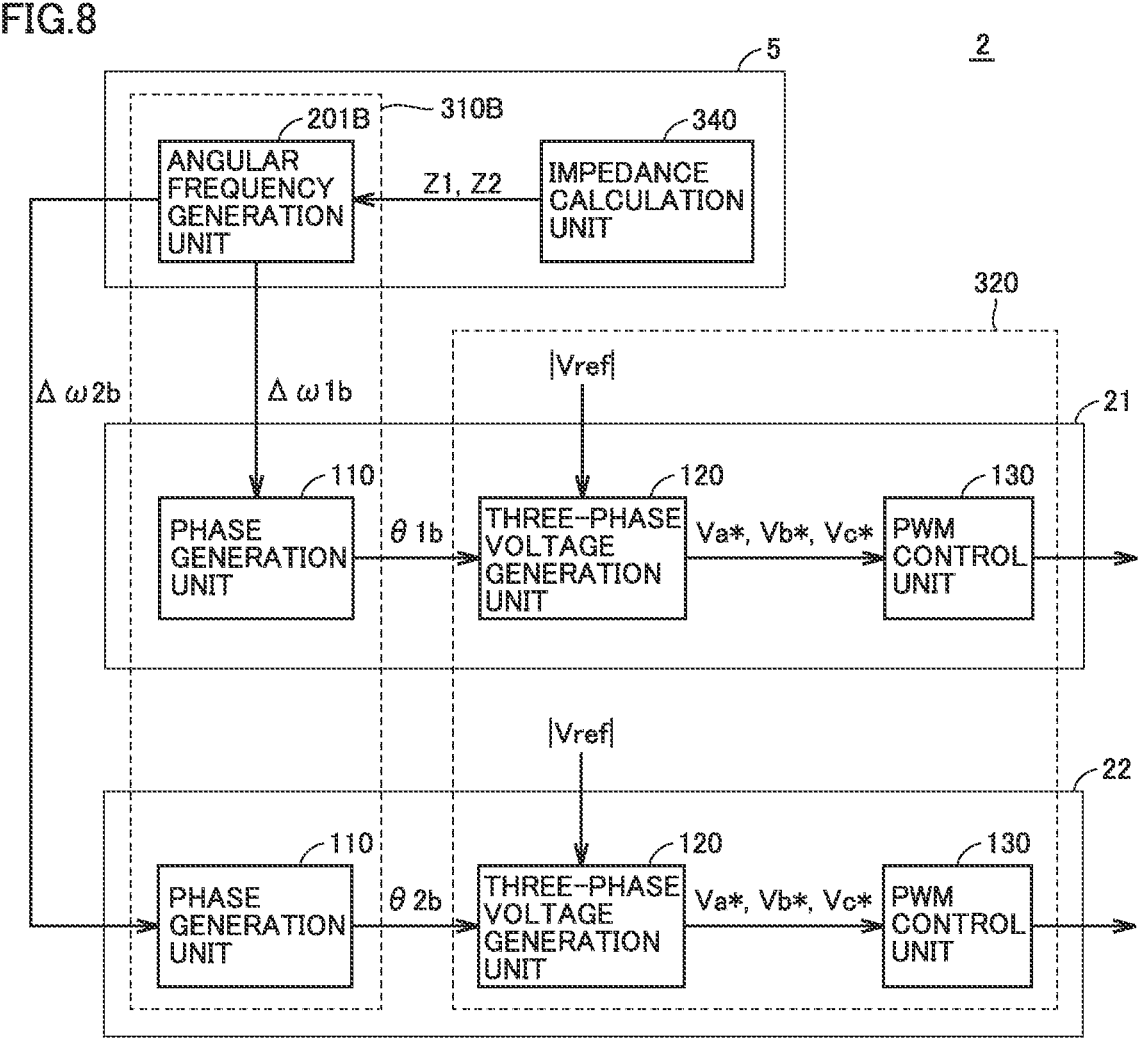
FIG. 8 is a block diagram showing one example of a functional configuration of a control device according to Variation 2 of Embodiment 1.

FIG. 8 is a block diagram showing one example of a functional configuration of a control device 2 according to Variation 2 of Embodiment 1. Referring to FIG. 8, the control device 2 includes, as a primary functional configuration, a power generator simulation unit 310B, a signal generation unit 320, and an impedance calculation unit 340. The impedance calculation unit 340 is included in the higher-level device 5. Note that the impedances of the converter transformers 51 and 52 have the same nominal value, which is now denoted as "Zo."

The impedance calculation unit 340 calculates the impedances of the converter transformers 51 and 52. Specifically, the impedance calculation unit 340 obtains an AC voltage V1 and an AC current I1 that are output from the power converter 31. The AC voltage V1 and the AC current I1 may be obtained from the lower-level device 21 or directly obtained from the current detector 61 and the voltage detector 71. Based on the AC voltage V1 and the AC current I2, the impedance calculation unit 340 calculates an impedance Z1 of the converter transformer 51 connected to the power converter 31.

The impedance calculation unit 340 also obtains an AC voltage V2 and an AC current I2 that are output from the power converter 32. The AC voltage V2 and the AC current I2 may be obtained from the lower-level device 22, or directly obtained from the current detector 62 and the voltage detector 72. Based on the AC voltage V2 and the AC current I2, the impedance calculation unit 340 calculates an impedance Z2 of the converter transformer 52 connected to the power converter 32.

The power generator simulation unit 310B corresponds to the power generator simulation unit 310 of FIG. 3 that includes an angular frequency generation unit 201B, instead of the angular frequency generation unit 201. Note that the phase generation unit 110 of FIG. 8 and the phase generation unit 110 of FIG. 5 have the same functional configuration.

Figure 9:
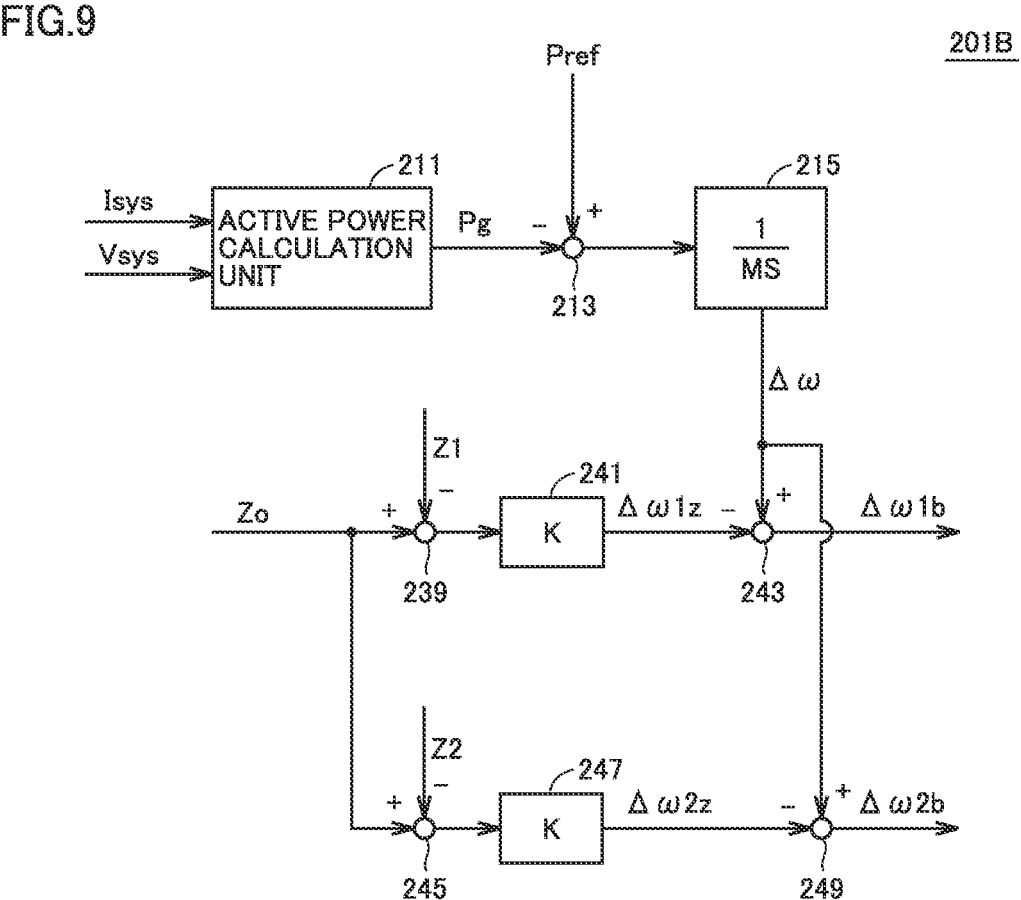
FIG. 9 is a block diagram showing one example of a functional configuration of an angular frequency generation unit according to Variation 2 of Embodiment 1.

The angular frequency generation unit 201B generates angular-frequency deviations $\Delta\omega 1b$ and $\Delta\omega 2b$. FIG. 9 is a block diagram showing one example of a functional configuration of the angular frequency generation unit 201B according to Variation 2 of Embodiment 1. Referring to FIG. 9, the angular frequency generation unit 201B is the same as the angular frequency generation unit 201 of FIG. 4, except for further including subtractors 239, 243, 245, and 249, and proportioners 241 and 247.

The subtractor 239 computes a difference $\Delta Z1$ (=Zo–Z1) between a predetermined impedance (i.e., the nominal value Zo) and the impedance Z1. The proportioner 241 multiplies the gain K by the difference $\Delta Z1$, and outputs a resultant multiplied value $\Delta\omega 1z$. The subtractor 243 computes an angular-frequency deviation $\Delta\omega 1b$ (=$\Delta\omega$–$\Delta\omega 1z$), which is the difference between the angular-frequency deviation $\Delta\omega$ and the multiplied value $\Delta\omega 1z$.

The subtractor 245 computes a difference $\Delta Z2$ (=Zo–Z2) between the nominal value Zo and the impedance Z2. The proportioner 247 multiplies the gain K by the difference $\Delta Z2$, and outputs a resultant multiplied value $\Delta\omega 2z$. The subtractor 249 computes an angular-frequency deviation $\Delta\omega 2b$ (=$\Delta\omega$–$\Delta\omega 2z$), which is the difference between the angular-frequency deviation $\Delta\omega$ and the multiplied value $\Delta\omega 2z$.

As noted above, the angular frequency generation unit 201B calculates the difference $\Delta Z1$ between the nominal value Zo and the impedance Z1 of the converter transformer 51 connected to the power converter 31, and, based on the difference $\Delta Z1$ and the angular-frequency deviation $\Delta\omega$, generates an angular-frequency deviation $\Delta\omega 1b$ for controlling the power converter 31. Specifically, the angular frequency generation unit 201B subtracts the multiplied value $\Delta\omega 1z$, obtained by multiplying the difference $\Delta Z1$ by the gain K, from the angular-frequency deviation $\Delta\omega$ to generate the angular-frequency deviation $\Delta\omega 1b$. The same goes for the method of generation of the angular-frequency deviation $\Delta\omega 2b$ for controlling the power converter 32.

Referring, again, to FIG. 8, based on the angular-frequency deviation $\Delta\omega 1b$ corresponding to the power converter 31, the phase generation unit 110 included in the lower-level device 21 generates a phase $\theta 1b$ for the AC voltage output from the power converter 31. Specifically, the phase generation unit 110 included in the lower-level device 21 time-integrates the sum of the angular-frequency deviation $\Delta\omega 1b$ and the reference angular frequency $\omega 0$ to generate the phase $\theta 1b$. Similarly, the phase generation unit 110 included in the lower-level device 22 time-integrates the sum of the angular-frequency deviation $\Delta\omega 2b$ and the reference angular frequency $\omega 0$ to generate a phase $\theta 2b$.

Based on the phase $\theta 1b$ generated by the power generator simulation unit 310B, the signal generation unit 320 generates a control signal for the power converter 31. Based on the phase $\theta 2b$, the signal generation unit 320 generates a control signal for the power converter 32. The functional configuration of the signal generation unit 320 is the same as that illustrated with respect to FIG. 3, and the detailed description thereof is therefore not repeated.

According to the configuration of FIG. 8, the impedances of the converter transformers 51 and 52 vary, the output powers of the power converters 31 and 32 can be averaged. For example, suppose that the impedance Z1 of the converter transformer 51 is greater than the nominal value Zo. In this case, the multiplied value $\Delta\omega 1z$ is a negative value, and the angular-frequency deviation $\Delta\omega 1b$ is greater than the angular-frequency deviation $\Delta\omega$ (i.e., $\Delta\omega 1b > \Delta\omega$). In other words, the angular-frequency deviation $\Delta\omega$ is compensated for so that the speed of the virtual generator increases (i.e., the output power increases). In this way, the reduction of the output power (e.g., the active power output), caused by an increase of the impedance Z1, is compensated for by the above control.

In contrast, if the impedance Z1 of the converter transformer 51 is less than the nominal value Zo, the multiplied value $\Delta\omega 1z$ is a positive value, and the angular-frequency deviation $\Delta\omega 1b$ is less than the angular-frequency deviation $\Delta\omega$ (i.e., $\Delta\omega 1b < \Delta\omega$). In other words, the angular-frequency deviation $\Delta\omega$ is compensated for such that the speed of the virtual generator decreases (i.e., the output power decreases). In this way, the increase of the output power, caused by a reduction of the impedance Z1, is compensated for by the above control. Note that the same goes for the converter transformer 52. In this way, variations in output power from the converter transformers 51 and 52 are reduced even if the impedances Z1 and Z2 of the converter transformers 51 and 52 vary. Thus, the entirety of the power storage facilities 101 and 102 can be regarded as one virtual generator, improving the stability of operation.

Embodiment 2

In Embodiment 1 described above, the power converters 31 and 32 are assumed to have the same (or about the same) capacity, and the power converters 31 and 32 are controlled based on the active power Pg, which is the sum of the active power P1 output from the power converter 31 and the active power P2 output from the power converter 32. In Embodiment 2, power converters 31 and 32 have different capacities, and the power converters 31 and 32 are controlled based on active powers P1 and P2, respectively. An overall configuration according to Embodiment 2 is the same as the overall configuration according to Embodiment 1 shown in FIG. 1.

<Functional Configuration of Control Device>

Figure 10:
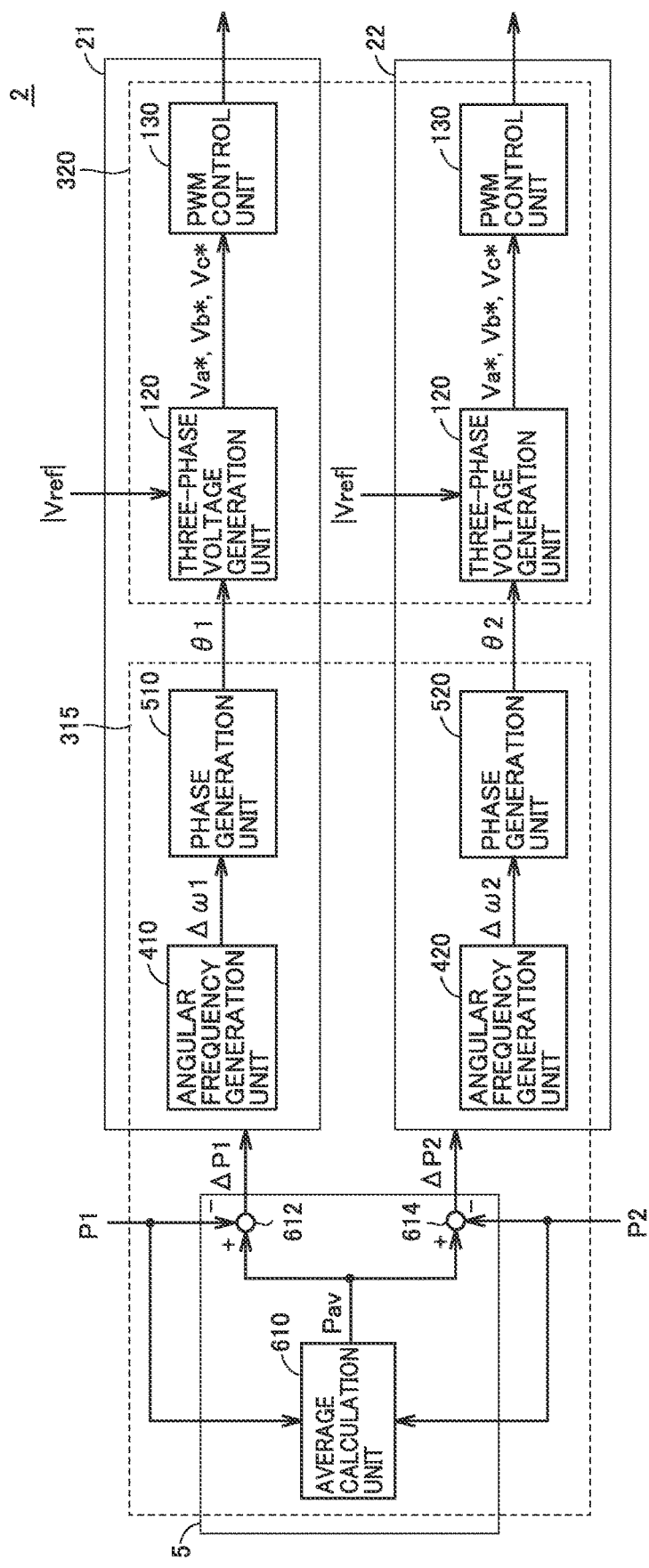
FIG. 10 is a block diagram showing one example of a functional configuration of a control device according to Embodiment 2.

FIG. 10 is a block diagram showing one example of a functional configuration of a control device 2 according to Embodiment 2. Referring to FIG. 10, the control device 2 includes, as a primary functional configuration, a power generator simulation unit 315 and a signal generation unit 320.

The power generator simulation unit 315 simulates the characteristics of a synchronous generator, based on the active powers P1 and P2 output from the respective power converters 31 and 32, to generate phases $\theta 1$ and $\theta 2$ for AC voltages output from the power converters 31 and 32. Based on the phase $\theta 1$ generated by the power generator simulation unit 315, the signal generation unit 320 generates a control signal for the power converter 31. Based on the phase $\theta 2$, the signal generation unit 320 generates a control signal for the power converter 32. The functional configuration of the signal generation unit 320 is the same as that illustrated with respect to FIG. 3, and the detailed description thereof is therefore not repeated.

The power generator simulation unit 315 includes an average calculation unit 610, subtractors 612 and 614, angular frequency generation units 410 and 420, and phase generation units 510 and 520. The average calculation unit 610 and the subtractors 612 and 614 are included in a higher-level device 5, the angular frequency generation unit 410 and the phase generation unit 510 are included in a lower-level device 21, and the angular frequency generation unit 420 and the phase generation unit 520 are included in a lower-level device 22.

The average calculation unit 610 calculates an average Pav, which is a weighted average of the active powers P1 and P2 output from the power converters 31 and 32, respectively. Suppose that the capacity of the power converter 31 is SM1, and the capacity of the power converter 32 is SM2. In this case, Pav=(SM1×P1+SM2×P2)/(SM1+SM2).

Note that the average calculation unit 610 calculates the active power P1, based on an AC current I1 and an AC voltage V1 that are obtained from a current detector 61 and a voltage detector 71, respectively, and calculates the active power P2, based on an AC current I2 and an AC voltage V2 that are obtained from a current detector 62 and a voltage detector 72, respectively. The average calculation unit 610 may also obtain the active powers P1 and P2 from the lower-level devices 21 and 22, respectively.

The subtractor 612 computes a difference ΔP1 (=Pav−P1) between the average Pav and the active power P1. The difference ΔP1 is input to the power generator simulation unit 315 included in the lower-level device 21. The subtractor 614 computes a difference ΔP2 (=Pav−P2) between the average Pav and the active power P2. The difference ΔP2 is input to the power generator simulation unit 315 included in the lower-level device 22.

The angular frequency generation unit 410 generates an angular-frequency deviation Δω1. The phase generation unit 510 generates a phase θ1, based on the angular-frequency deviation Δω1. The angular frequency generation unit 420 generates an angular-frequency deviation Δω2. The phase generation unit 510 generates a phase θ2, based on the angular-frequency deviation Δω2.

Figure 11:
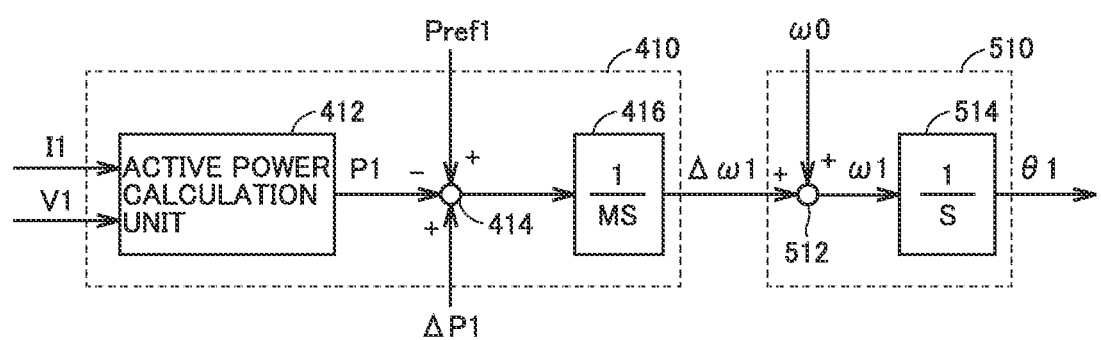
FIG. 11 is a block diagram showing one example of a functional configuration of an angular frequency generation unit and a phase generation unit according to Embodiment 2.

FIG. 11 is a block diagram showing one example of a functional configuration of the angular frequency generation unit 410 and the phase generation unit 510 according to Embodiment 2. The angular frequency generation unit 410 includes an active power calculation unit 412, a subtractor 414, and an integrator 416.

The active power calculation unit 412 calculates the active power P1, based on the AC current I1 and the AC voltage V1. The subtractor 414 computes a sum P1x (=Pref1−P1+ΔP1), which is obtained by adding the difference ΔP1 to the difference between the active power P1 and an active power target value Pref1 which is a target value for the active power P1. The active power target value Pref1 is set, as appropriate, by a system operator. The integrator 416 time-integrates the output value (i.e., the sum P1x) of the subtractor 414 and outputs the angular-frequency deviation Δω1.

The phase generation unit 510 includes an adder 512 and an integrator 514. The adder 512 adds the angular-frequency deviation Δω1, generated by the angular frequency generation unit 410, and a reference angular frequency ω0, and outputs a resultant angular frequency ω1 (=Δω1+ω0). The integrator 514 time-integrates the angular frequency ω1, and outputs the phase θ1 for the AC voltage V1 output from the power converter 31.

The functions of the angular frequency generation unit 420 and the phase generation unit 520 included in the lower-level device 22 are the same as the functions of the angular frequency generation unit 410 and the phase generation unit 510, respectively. Specifically, the angular frequency generation unit 420 computes a value ΔP2x (=Pref2−P2+ΔP2), which is obtained by adding the difference ΔP2 to the difference between the active power P2, calculated based on the AC current I2 and the AC voltage V2, and an active power target value Pref2 for the active power P2. The angular frequency generation unit 420 time-integrates the value ΔP2x, and outputs the angular-frequency deviation Δω2. The phase generation unit 520 time-integrates an angular frequency ω2 (=Δω2+ω0), obtained by adding the angular-frequency deviation Δω2 and the reference angular frequency ω0, and outputs the phase θ2 for the AC voltage V2 output from the power converter 32.

From the foregoing, in the configuration of FIG. 11, the power generator simulation unit 315 generates the phases θ1 and θ2 for the AC voltages output from the power converters 31 and 32, based on the active powers P1 and P2, the active power target values Pref1 and Pref2, and the average Pav. Specifically, the power generator simulation unit 315 calculates the sum P1x, obtained by adding the difference ΔP1 between the active power P1 and the average Pav to the difference between the active power P1 and the active power target value Pref1. The power generator simulation unit 315 time-integrates the sum P1x to generate the angular-frequency deviation Δω1, and time-integrates the sum (i.e., ω1) of the angular-frequency deviation Δω1 and the reference angular frequency ω0 to generate the phase θ1. The same goes for the method of generation of the phase θ2.

In the configuration of FIG. 11, the average Pav can be considered as an average active power that is output when the power storage facilities 101 and 102 are regarded as one virtual generator. Then, the difference between the average Pav and the active power output from the power converter 31 and the difference between the average Pav and the power converter 32 are used to compensate for the angular-frequency deviation. In this way, for example, if the active power P1 output from the power converter 31 is less than the average Pav, the phase θ1 is increased in order to increase the active power P1 to the average Pav. The active power P1 is then increased by the power converter 31 outputting a voltage waveform having this phase θ1. If the active power P1 is greater than the average Pav, in contrast, the phase θ1 is reduced in order to reduce the active power P1 to the average Pav. The active power P1 is reduced by the power converter 31 outputting a voltage waveform having the phase θ1.

This can compensate for the deviations of the active powers P1 and P2 from the active power (i.e., the average Pav) when the power storage facilities 101 and 102 are regarded as one virtual generator. Therefore, the power converters 31 and 32 can assure about the same room on the limit of the output active power based on their own capacities. Accordingly, a situation can be avoided that one of the power converters prematurely reaches the limit in the event of abrupt variation in output power, ending up being unable to output any further.

Moreover, for the power converters 31 and 32 having different capacities, control signals as a function of their capacities are input to the power converters 31 and 32. Therefore, the power converters 31 and 32 are controlled in a coordinated manner even if they have different capacities. In addition, the power converters 31 and 32 can assure about the same room on the output power when the power storage facilities 101 and 102 connected in parallel are regarded as one virtual generator.

Figure 12:
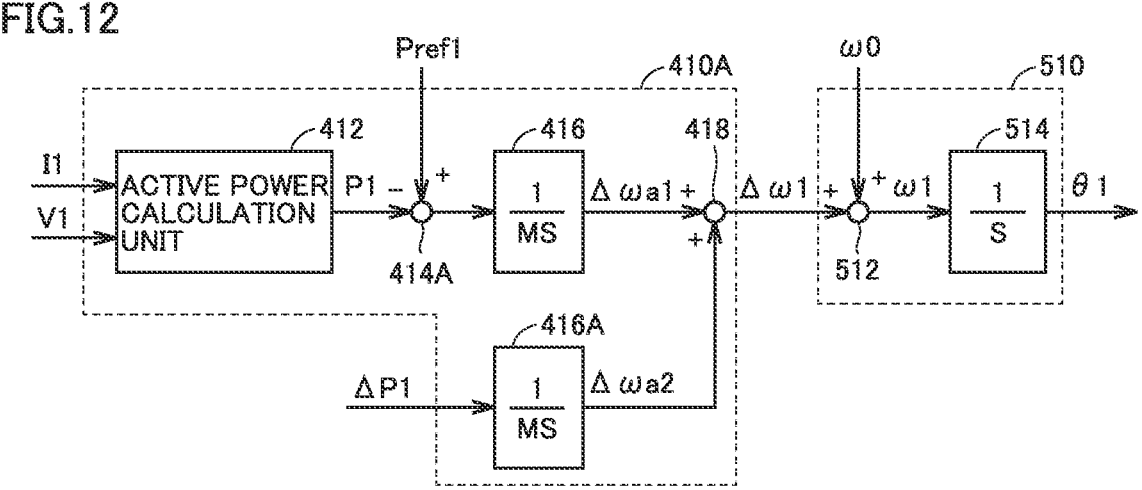
FIG. 12 is a block diagram showing another example of the functional configuration of the angular frequency generation unit and the phase generation unit according to Embodiment 2.

Here, the location where the difference ΔP1 is applied to in the control logic for generating the phase θ1 of FIG. 11 is not limited to the configuration shown in FIG. 11. FIG. 12 is a block diagram showing another example of the functional configuration of the angular frequency generation unit 410 and the phase generation unit 510, according to Embodiment 2. For convenience, the symbol "A" is added to the angular frequency generation unit 410A while the angular frequency generation unit 410A corresponds to the angular frequency generation unit 410 of FIG. 10. The same goes for FIG. 13.

The angular frequency generation unit 410A includes an active power calculation unit 412, a subtractor 414A, integrators 416 and 416A, and an adder 418. The subtractor 414A calculates a difference (i.e., Pref1−P1) between the active power P1 and the active power target value Pref1. The integrator 416 time-integrates the difference and outputs an angular-frequency deviation $\Delta\omega a1$. The integrator 416A time-integrates the difference $\Delta P1$, and outputs an angular-frequency deviation $\Delta\omega a2$. The adder 418 adds the angular-frequency deviation $\Delta\omega a1$ and the angular-frequency deviation $\Delta\omega a2$, and outputs an angular-frequency deviation $\Delta\omega 1$.

The configuration of the phase generation unit 510 is the same as the configuration of FIG. 11, and the detailed description thereof is therefore not repeated. The method of generation of the phase $\theta 2$ is also the same as the method of generation of the phase $\theta 1$.

From the foregoing, in the configuration of FIG. 12, the power generator simulation unit 315 time-integrates the difference between the active power P1 and the active power target value Pref1 and generates the angular-frequency deviation $\Delta\omega a1$, and time-integrates the difference $\Delta P1$ between the active power P1 and the average Pav and generates the angular-frequency deviation $\Delta\omega a2$. The power generator simulation unit 315 time-integrates the sum ($=\Delta\omega a1+\Delta\omega a2+\omega 0$) of the angular-frequency deviation $\Delta\omega a1$, the angular-frequency deviation $\Delta\omega a2$, and the reference angular frequency $\omega 0$ to generate the phase $\theta 1$. The same goes for the method of generation of the phase $\theta 2$. The configuration of FIG. 12 yields the same advantages effects as the configuration of FIG. 11.

Figure 13:
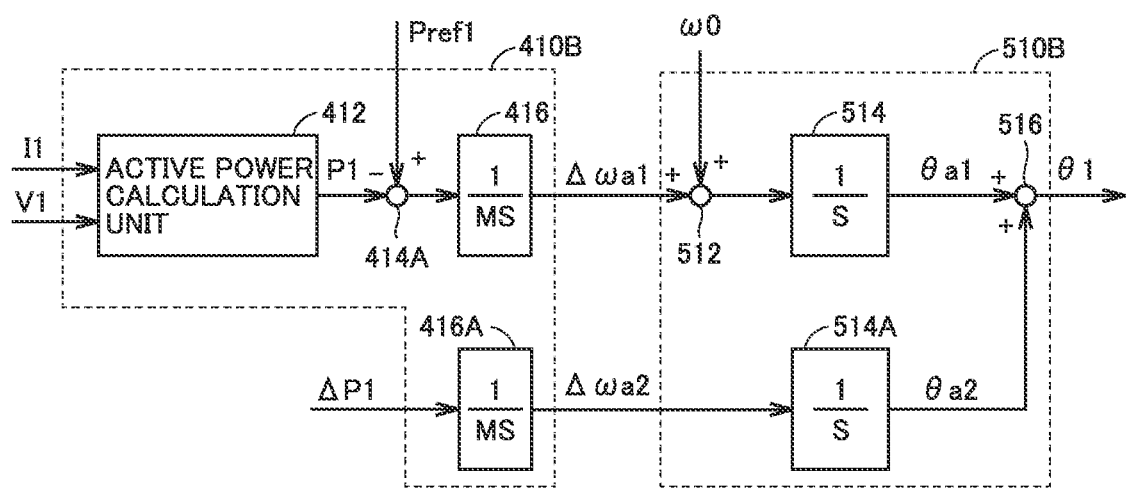
FIG. 13 is a block diagram showing another example of the functional configuration of the angular frequency generation unit and the phase generation unit according to Embodiment 2.

FIG. 13 is a block diagram of still another example of the functional configuration of the angular frequency generation unit 410 and the phase generation unit 510, according to Embodiment 2. The angular frequency generation unit 410B includes an active power calculation unit 412, a subtractor 414A, and integrators 416 and 416A. The angular frequency generation unit 410B is the same as the angular frequency generation unit 410A of FIG. 12, except for not including the adder 418, provided that the angular-frequency deviation $\Delta\omega a1$ and the angular-frequency deviation $\Delta\omega a2$ are output to the phase generation unit 510B. The other configuration is the same as the configuration of FIG. 12, and the detailed description thereof is therefore not repeated.

The phase generation unit 510B includes an adder 512, integrators 514 and 514A, and an adder 516. The adder 512 outputs the sum ($=\Delta\omega a1+\omega 0$) of the angular-frequency deviation $\Delta\omega a1$ and the reference angular frequency $\omega 0$. The integrator 514 time-integrates the sum and outputs a phase $\theta a1$. The integrator 514A time-integrates the angular-frequency deviation $\Delta\omega a2$, and outputs a phase $\theta a2$. The adder 516 adds the phase $\theta a1$ and the phase $\theta a2$, and outputs a phase $\theta 1$ ($=\theta a1+\theta a2$). The method of generation of the phase $\theta 2$ is the same as the method of generation of the phase $\theta 1$.

From the foregoing, in the configuration of FIG. 13, the power generator simulation unit 315 time-integrates the difference between the active power P1 and the active power target value Pref1 and generates the angular-frequency deviation $\Delta\omega a1$, and time-integrates the difference $\Delta P1$ between the active power P1 and the average Pav and generates the angular-frequency deviation $\Delta\omega a2$. The power generator simulation unit 315 time-integrates the sum ($=\Delta\omega a1+\omega 0$) of the angular-frequency deviation $\Delta\omega a1$ and the reference angular frequency $\omega 0$ and generates the phase $\theta a1$, and time-integrates the angular-frequency deviation $\Delta\omega a2$ and generates the phase $\theta a2$. The power generator simulation unit 315 adds the phase $\theta a1$ and the phase $\theta a2$ to generate the phase $\theta 1$. The same goes for the method of generation of the phase $\theta 2$. The configuration of FIG. 13 also yields the same advantages effects as the configuration of FIG. 11.

While the adder 512 is disposed between the integrator 416 and the integrator 514 in FIG. 13, it should be noted that the adder 512 may instead be disposed between the integrator 416A and the integrator 514A. In this case, the integrator 514 time-integrates the angular-frequency deviation $\Delta\omega a1$ and generates the phase $\theta a1$, and the integrator 514A time-integrates the sum ($=\Delta\omega a2+\omega 0$) of the angular-frequency deviation $\Delta\omega a2$ and the reference angular frequency $\omega 0$ and generates the phase $\theta a2$.

(Variation 1)

Figure 14:
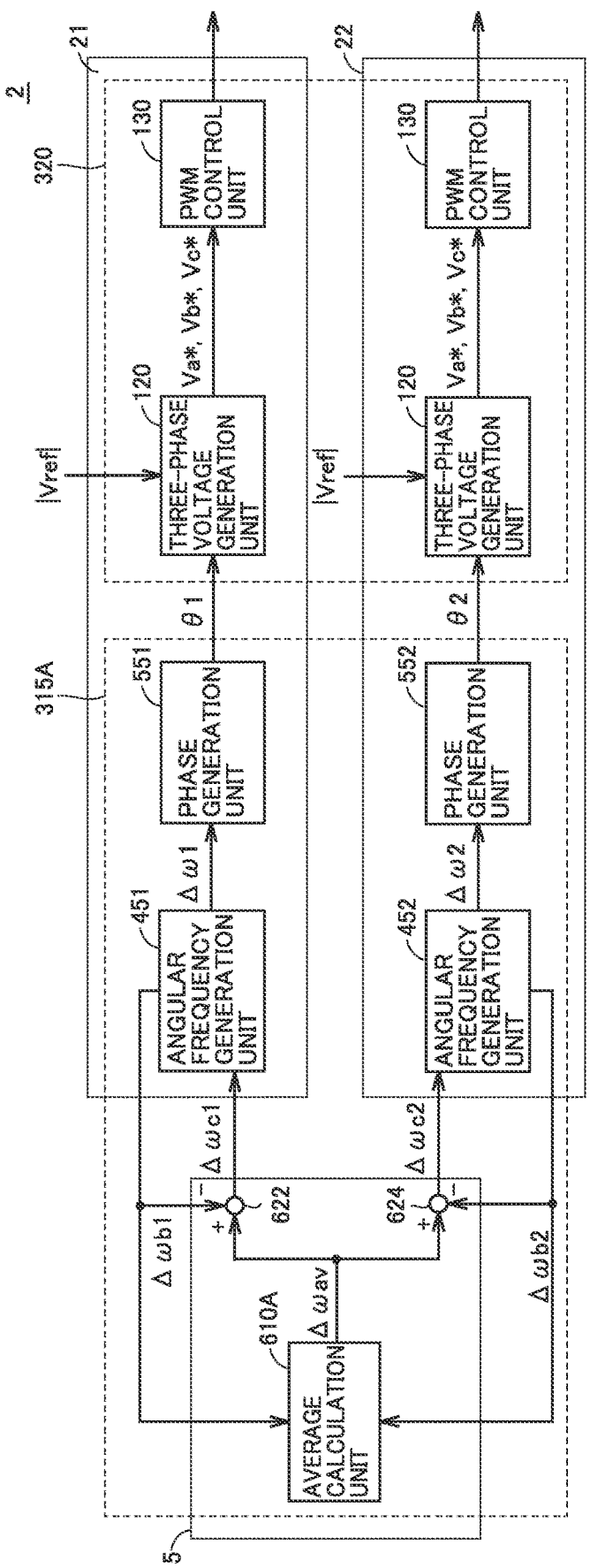
FIG. 14 is a block diagram showing one example of a functional configuration of a control device according to Variation 1 of Embodiment 2.

FIG. 14 is a block diagram showing one example of a functional configuration of a control device 2 according to Variation 1 of Embodiment 2. Referring to FIG. 14, the control device 2 includes, as a primary functional configuration, a power generator simulation unit 315A and a signal generation unit 320.

The power generator simulation unit 315A includes an average calculation unit 610A, subtractors 622 and 624, angular frequency generation units 451 and 452, and phase generation units 551 and 552. The average calculation unit 610A and the subtractors 622 and 624 are included in a higher-level device 5, the angular frequency generation unit 451 and the phase generation unit 551 are included in a lower-level device 21, and the angular frequency generation unit 452 and the phase generation unit 552 are included in a lower-level device 22.

The average calculation unit 610A calculates an average $\Delta\omega av((\Delta\omega b1+\Delta\omega b2)/2)$ of an angular-frequency deviation $\Delta\omega b1$ generated by the angular frequency generation unit 451 and an angular-frequency deviation $\Delta\omega b2$ generated by the angular frequency generation unit 421.

The subtractor 622 computes a difference $\Delta\omega c1$ ($=\Delta\omega av-\Delta\omega b1$) between the average $\Delta\omega av$ and the angular-frequency deviation $\Delta\omega b1$. The difference $\Delta\omega c1$ is input to the angular frequency generation unit 451. The subtractor 624 computes a difference $\Delta\omega c2$ ($=\Delta\omega av-\Delta\omega b2$) between the average $\Delta\omega av$ and the angular-frequency deviation $\Delta\omega b2$. The difference $\Delta\omega c2$ is input to the angular frequency generation unit 421.

The angular frequency generation unit 451 generates the angular-frequency deviation $\Delta\omega 1$. Based on the angular-frequency deviation $\Delta\omega 1$, the phase generation unit 551 generates the phase $\theta 1$. The angular frequency generation unit 452 generates the angular-frequency deviation $\Delta\omega 2$. Based on the angular-frequency deviation $\Delta\omega 2$, the phase generation unit 552 generates the phase $\theta 2$.

Figure 15:
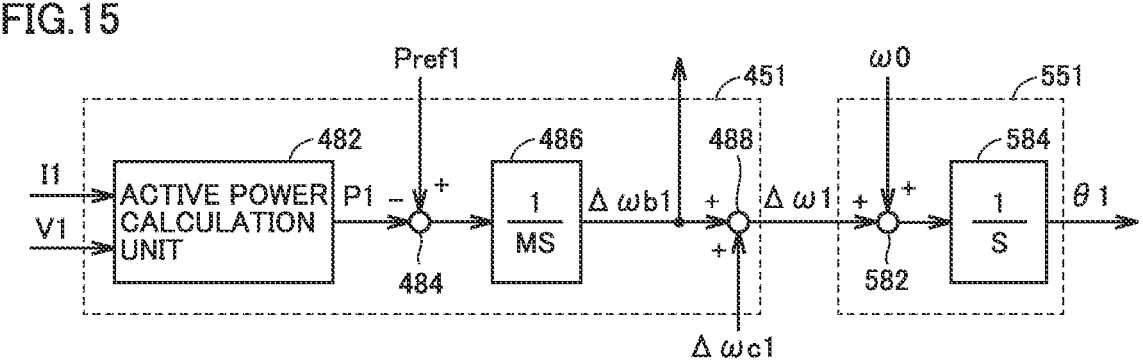
FIG. 15 is a block diagram showing one example of a functional configuration of an angular frequency generation unit and a phase generation unit according to Variation 1 of Embodiment 2.

FIG. 15 is a block diagram showing one example of a functional configuration of the angular frequency generation unit 451 and the phase generation unit 551, according to Variation 1 of Embodiment 2. The angular frequency generation unit 451 includes an active power calculation unit 482, a subtractor 484, an integrator 486, and an adder 488.

The active power calculation unit 482 calculates the active power P1, based on the AC current I1 and the AC voltage V1. The subtractor 484 computes a difference between the active power target value Pref1 and the active power P1. The integrator 486 time-integrates the difference and outputs an angular-frequency deviation $\Delta\omega b1$. The angular-frequency deviation $\Delta\omega b1$ is output to the adder 488 and the higher-level device 5. The adder 488 adds the angular-frequency deviation $\Delta\omega b1$ and the difference $\Delta\omega c1$, and generates an angular-frequency deviation $\Delta\omega 1$ ($=\Delta\omega b1+\Delta\omega c1$).

The phase generation unit 551 includes an adder 582 and an integrator 584. The adder 582 adds the angular-frequency deviation $\Delta\omega 1$ and the reference angular frequency $\omega 0$, and outputs a resultant angular frequency $\omega 1$. The integrator 584 time-integrates the angular frequency $\omega 1$, and outputs the phase $\theta 1$. The angular frequency generation unit 452 and the phase generation unit 552 included in the lower-level device 22 have the same function as the angular frequency generation unit 451 and the phase generation unit 551, respectively. Specifically, the angular frequency generation unit 452 time-integrates the difference between the active power target value Pref2 and the active power P2 and generates the angular-frequency deviation $\Delta\omega b2$, and adds the angular-frequency deviation $\Delta\omega b2$ and the difference $\Delta\omega c2$ and generates the angular-frequency deviation $\Delta\omega 2$. The phase generation unit 552 time-integrates the angular frequency $\omega 2$, obtained by adding the angular-frequency deviation $\Delta\omega 2$ and the reference angular frequency $\omega 0$, and outputs the phase $\theta 2$.

From the foregoing, in the configuration of FIG. 14, based on the angular-frequency deviation $\Delta\omega b1$ corresponding to the power converter 31, the reference angular frequency $\omega 0$, and the average $\Delta\omega av$ of the angular-frequency deviations $\Delta\omega b1$ and $\Delta\omega b2$, the power generator simulation unit 315A generates the phase $\theta 1$ for the AC voltage output from the power converter 31. Specifically, the power generator simulation unit 315A time-integrates the sum (i.e., $\omega 1$) of the angular-frequency deviation $\Delta\omega b1$, the difference $\Delta\omega c1$, and the reference angular frequency $\omega 0$ to generate the phase $\theta 1$. The power generator simulation unit 315A also time-integrates the sum (i.e., $\omega 2$) of the angular-frequency deviation $\Delta\omega b2$, the difference $\Delta\omega c1$, and the reference angular frequency $\omega 0$, and generates the phase $\theta 2$.

In the configuration of FIG. 14, the average $\Delta\omega av$ can be considered as an average angular-frequency deviation when the power storage facilities 101 and 102 are regarded as one virtual generator. Then, (i) the difference $\Delta\omega c1$ between the average $\Delta\omega av$ and the angular-frequency deviations $\Delta\omega b1$ corresponding to the power converters 31 and (ii) the difference $\omega c2$ between the average $\Delta\omega av$ and the angular-frequency deviations $\Delta\omega b2$ corresponding to the power converters 32, are used to compensate for the angular-frequency deviation. In this way, for example, if the angular-frequency deviation $\Delta\omega b1$ corresponding to the power converter 31 is less than the average $\Delta\omega av$, the phase $\theta 1$ is increased in order to increase the angular-frequency deviation $\Delta\omega b1$ to the average $\Delta\omega av$. If the angular-frequency deviation $\Delta\omega b1$ is greater than the average $\Delta\omega av$, in contrast, the phase $\theta 1$ is reduced in order to reduce the angular-frequency deviation $\Delta\omega b1$ to the average $\Delta\omega av$.

This can compensate for the deviations of the angular-frequency deviations $\Delta\omega b1$ and $\Delta\omega b2$ from the angular-frequency deviation (i.e., the average $\Delta\omega av$) when the power storage facilities 101 and 102 are regarded as one virtual generator. Therefore, the power converters 31 and 32 are controlled in a coordinated manner even if they have different capacities. In addition, the power converters 31 and 32 can assure about the same room on the output power when they are controlled while regarding, as one virtual generator, the power storage facilities 101 and 102 connected in parallel being.

(Variation 2)

Figure 16:
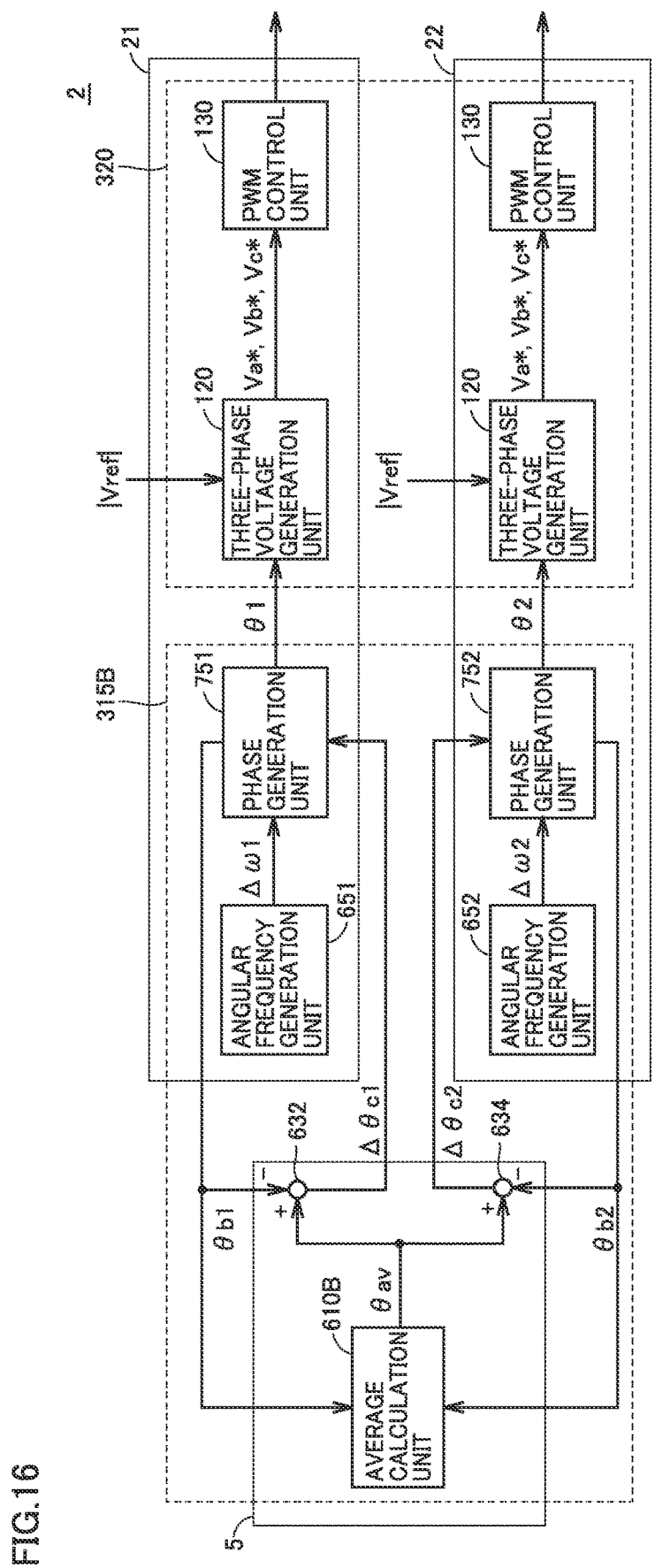
FIG. 16 is a block diagram showing one example of a functional configuration of a control device according to Variation 2 of Embodiment 2.

FIG. 16 is a block diagram showing one example of a functional configuration of the control device 2, according to Variation 2 of Embodiment 2. Referring to FIG. 16, the control device 2 includes, as a primary functional configuration, a power generator simulation unit 315B and a signal generation unit 320.

The power generator simulation unit 315B includes an average calculation unit 610B, subtractors 632 and 634, angular frequency generation units 651 and 652, and phase generation units 751 and 752. The average calculation unit 610B and the subtractors 632 and 634 are included in a higher-level device 5, the angular frequency generation unit 651 and the phase generation unit 751 are included in a lower-level device 21, and the angular frequency generation unit 652 and the phase generation unit 752 are included in a lower-level device 22.

The average calculation unit 610B calculates an average $\theta av$ ($=(\theta b1+\theta b2)/2$) of the phase $\theta b1$ generated by the phase generation unit 751 and the phase $\theta b2$ generated by the phase generation unit 752.

The subtractor 632 computes a difference $\Delta\theta c1$ ($=\theta av-\theta b1$) between the average $\theta av$ and the phase $\theta b1$. The difference $\Delta\theta c1$ is input to the phase generation unit 751. The subtractor 634 computes a difference $\Delta\theta c2$ ($=\theta av-\theta b2$) between the average $\theta av$ and the phase $\theta b2$. The difference $\Delta\theta c2$ is input to the phase generation unit 752.

The angular frequency generation unit 651 generates the angular-frequency deviation $\Delta\omega 1$. Based on the angular-frequency deviation $\Delta\omega 1$, the phase generation unit 751 generates the phase $\theta 1$. The angular frequency generation unit 652 generates the angular-frequency deviation $\Delta\omega 1$. Based on the angular-frequency deviation $\Delta\omega 2$, the phase generation unit 752 generates the phase $\theta 2$.

Figure 17:
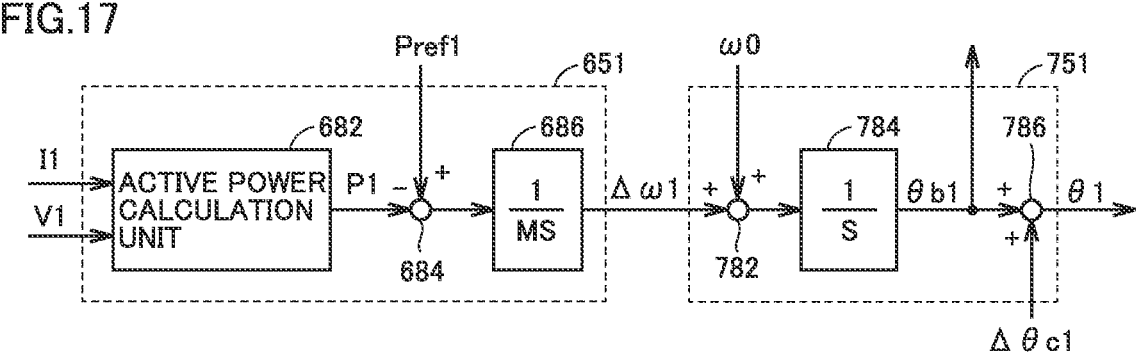
FIG. 17 is a block diagram showing one example of a functional configuration of an angular frequency generation unit and a phase generation unit according to Variation 2 of Embodiment 2.

FIG. 17 is a block diagram showing one example of a functional configuration of the angular frequency generation unit 651 and the phase generation unit 751, according to Variation 2 of Embodiment 2. The angular frequency generation unit 651 includes an active power calculation unit 682, a subtractor 684, and an integrator 686.

The active power calculation unit 682 calculates the active power P1, based on the AC current I1 and the AC voltage V1. The subtractor 684 computes the difference between the active power target value Pref1 and the active power P1. The integrator 686 time-integrates the difference and outputs the angular-frequency deviation $\Delta\omega 1$.

The phase generation unit 751 includes an adder 782, an integrator 784, and an adder 786. The adder 782 outputs the sum of the angular-frequency deviation $\Delta\omega 1$ and the reference angular frequency $\omega 0$. The integrator 784 time-integrates the sum, and outputs the phase $\theta b1$. The phase $\theta b1$ is output to the adder 786 and the higher-level device 5. The adder 786 adds the phase $\theta b1$ and the difference $\theta c1$ and outputs the phase $\theta 1$.

The angular frequency generation unit 652 and the phase generation unit 752 included in the lower-level device 22 have the same function as the angular frequency generation unit 651 and the phase generation unit 751, respectively. Specifically, the angular frequency generation unit 652 time-integrates the difference between the active power target value Pref2 and the active power P2, and generates the angular-frequency deviation $\Delta\omega 2$. The phase generation unit 752 time-integrates the sum of the angular-frequency deviation $\Delta\omega 2$ and the reference angular frequency $\omega 0$ and generates the phase θb2, and adds the phase θb2 and the difference θc2 and generates the phase θ2.

From the foregoing, in the configuration of FIG. 16, based on the phase θb1 corresponding to the power converter 31, and the average θav of the phases θb1 and θb2, the power generator simulation unit 315B generates a phase θ1 for the AC voltage output from the power converter 31. Specifically, the power generator simulation unit 315B adds the phase θb1 and the difference Δθc1 between the phase θb1 and the average θav to generate the phase θ1. The power generator simulation unit 315B adds the phase θb2 and the difference Δθc2 between the phase θb2 and the average θav to generate the phase θ2.

In the configuration of FIG. 16, the average θav can be considered as an average phase when the power storage facilities 101 and 102 are regarded as one virtual generator. Then, (i) the difference Δθc1 between the average θav and the phase θb1 corresponding to the power converter 31 and (ii) the difference Δθc2 between the average θav and the phase θb2 corresponding to the power converter 32, are used to compensate for the phase. In this way, for example, if the phase θb1 corresponding to the power converter 31 is less than the average θav, the phase θ1 is increased in order to increase the phase θb1 to the average θav. If the phase θb1 is greater than the average θav, in contrast, the phase θ1 is reduced in order to reduce the phase θb1 to the average θav.

This can compensate for the deviations of the phases θb1 and θb2 from the phase (i.e., the average θav) when the power storage facilities 101 and 102 are regarded as one virtual generator. Therefore, the power converters 31 and 32 are controlled in a coordinated manner even if they have different capacities. In addition, the power converters 31 and 32 can assure about the same room on the output power when they are controlled while regarding, as one virtual generator, the power storage facilities 101 and 102 connected in parallel.

Note that the power generator simulation unit (e.g., the power generator simulation units 315, 315A, and 315B) according to Embodiment 2 described above calculates an average of parameters for use in generation of the phases θ1 and θ2, and generates the phase for the AC voltage output from the power converter, based on parameters corresponding to the power converters, and an average of the parameters. For example, the power generator simulation unit 315 of FIG. 10 calculates the active powers P1 and P2 as the parameters. The power generator simulation unit 315A of FIG. 14 calculates the angular-frequency deviations Δωb1 and Δωb2 as the parameters. The power generator simulation unit 315B of FIG. 16 calculates the phases θb1 and θb2 as the parameters.

OTHER EMBODIMENTS (1) In the embodiments described above, the converter transformers 51 and 52 have been described as being directly connected to the PCC 7 of the power system 3. However, the present disclosure is not limited to such a configuration. For example, the converter transformers 51 and 52 may be connected to the PCC 7 via an interconnection transformer.

Figure 18:
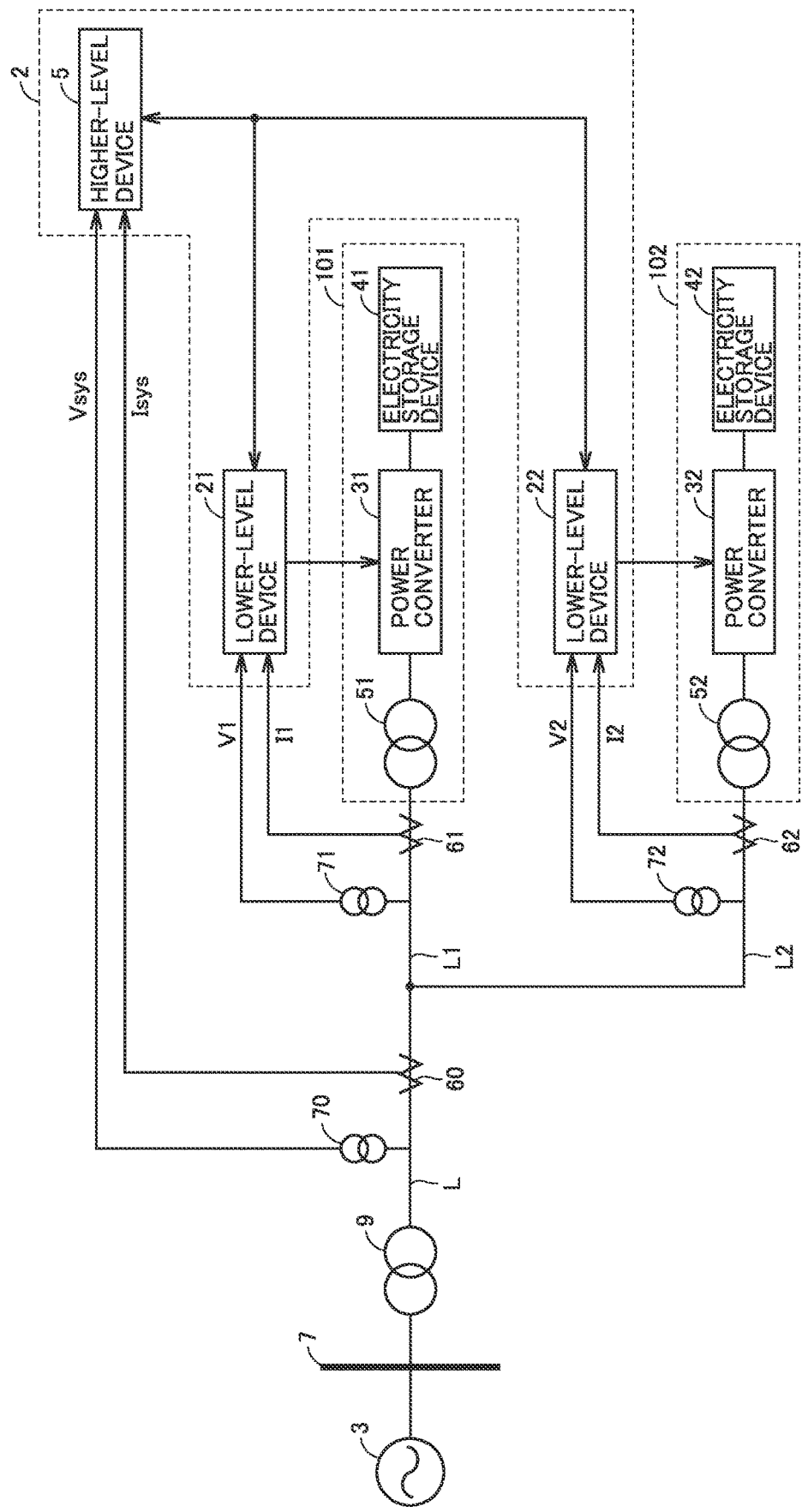
FIG. 18 is a diagram for illustrating another example of an overall configuration of an electric power control system.

FIG. 18 is a diagram for illustrating another example of an overall configuration of the electric power control system. Referring to FIG. 18, an interconnection transformer 9 is disposed between a PCC 7 of a power system 3 and converter transformers 51 and 52. This connects the converter transformers 51 and 52 to the PCC 7 via the interconnection transformer 9. The configuration shown in FIG. 18 is useful, in particular, when the power system 3 has a high system voltage for the reasons that will be now described below.

The voltage on the primary side (i.e., the power system 3 side) of each of converter transformers 51 and 52 needs to match the system voltage of the power system 3. Due to this, if the converter transformers 51 and 52 are directly connected to the PCC 7 when the system voltage of the power system 3 is high, the difference increases between the primary side voltages and the secondary side (i.e., the power-converter side) voltages of the converter transformers 51 and 52. In this case, an overdimentioned design of the converter transformers 51 and 52 results.

According to the configuration of FIG. 18, since the interconnection transformer 9 is disposed between the PCC 7 of the power system 3 and the converter transformers 51 and 52, the converter transformers 51 and 52 can have reduced rated voltages. Moreover, since the interconnection transformer 9 is shared between the power storage facilities 101 and 102, the size reduction and cost reduction of the electric power control system are possible.

(2) The configuration according to Embodiment 2 is useful when the power converters 31 and 32 have different capacities. However, such configuration may be applied to the power converters 31 and 32 having the same capacity.

(3) The respective functional configurations of the control device 2 described above may be included in different devices from the above. For example, while the angular frequency generation unit 201 is included in the higher-level device 5, and the phase generation unit 110, the three-phase voltage generation unit 120, and the PWM control unit 130 are included in the lower-level devices 21 and 22 in FIG. 3, the present disclosure is not limited thereto. The angular frequency generation unit 201 and the phase generation unit 110 may be included in the higher-level device 5 and the three-phase voltage generation unit 120 and the PWM control unit 130 may be included in the lower-level devices 21 and 22, or all of these functional configurations may be included in the higher-level device 5. The same goes for FIGS. 6, 8, 10, 14, and 16. In other words, the control device 2, as a whole, may have the functional configurations illustrated in the figures. Which devices the respective functional configurations are included is not limited.

(4) The configurations exemplified as the above-described embodiments are one example configuration of the present disclosure, and can be combined with other known technique, or can be modified, such as part of the configuration being omitted, without departing from the gist of the present disclosure. Moreover, in the above-described embodiments, the processes and configurations described in the other embodiments may be appropriately adapted and implemented.

The presently disclosed embodiments should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST 2 control device; 3 power system; 5 higher-level device; 7 point of common coupling; 9 interconnection transformer, 21, 22 lower-level device; 31, 32 power converter, 41, 42 electricity storage device; 51, 52 converter transformer, 60, 61, 62 current detector, 70, 71, 72 voltage detector, 90 input converter, 91 sample and hold circuit; 92 multiplexer, 93 analog-to-digital converter, 94 CPU; 95 RAM; 96 ROM; 97 I/O interface; 98 auxiliary storage; 99 bus; 101,102 power storage facility; 120 three-phase voltage generation unit; 130 PWM control unit; 310, 310A, 310B, 315, 315A, 315B power generator simulation unit; 320 signal generation unit; 330 SOC detection unit; and 340 impedance calculation unit.

The invention claimed is:

1. An electric power control system, comprising:
a plurality of power converters connected in parallel, wherein
each power converter, among the plurality of power converters, converts a direct-current power of an electricity storage device connected to the power converter into an alternating-current power, and outputs the alternating-current power to a power system via a converter transformer;
a power generator simulation unit to simulate characteristics of a synchronous generator based on an aggregate active power to generate a phase for an alternating-current voltage output from the power converter, the aggregate active power being a total sum of active powers output from the plurality of power converters; and
a signal generation unit to generate a control signal for the power converter based on the phase of the alternating-current voltage for the power converter generated by the power generator simulation unit, wherein
the power generator simulation unit
generates a first angular frequency deviation based on a first difference between the aggregate active power and a target value of the aggregate active power, and
generates the phase of the alternating-current voltage output from the power converter based on the first angular frequency deviation.

2. The electric power control system according to claim 1, wherein
the power generator simulation unit
time-integrates the first difference to generate the first angular frequency deviation, and
time-integrates a sum of the first angular frequency deviation and a reference angular frequency to generate the phase of the alternating-current voltage output from the power converter.

3. The electric power control system according to claim 2, wherein
an interconnection transformer is disposed between a plurality of converter transformers connected to the plurality of power converters and a point of common coupling of the power system.

4. The electric power control system according to claim 1, further comprising
a SOC detection unit to detect states of charge of electricity storage devices connected to the plurality of power converters, wherein
the power generator simulation unit
calculates an average of the states of charge of the electricity storage devices,
calculates, for each power converter, a second difference between the average and a state of charge of an electricity storage device connected to the power converter, and generates, based on the second difference and the first angular frequency deviation, a second angular frequency deviation for controlling the power converter, and
generates, for each power converter, the phase of the alternating-current voltage output from the power converter, based on the second angular frequency deviation for controlling the power converter.

5. The electric power control system according to claim 4, wherein
the power generator simulation unit
generates, for each power converter, the second angular frequency deviation for controlling the power converter, by subtracting, from the first angular frequency deviation, a multiplied value obtained by multiplying the second difference corresponding to the power converter by a gain, and
generates the phase for the alternating-current voltage output from the power converter, by time-integrating a sum of the second angular frequency deviation and a reference angular frequency.

6. The electric power control system according to claim 5, wherein
an interconnection transformer is disposed between a plurality of converter transformers connected to the plurality of power converters and a point of common coupling of the power system.

7. The electric power control system according to claim 4, wherein
an interconnection transformer is disposed between a plurality of converter transformers connected to the plurality of power converters and a point of common coupling of the power system.

8. The electric power control system according to claim 1, further comprising
an impedance calculation unit to calculate an impedance of the converter transformer connected to the power converter, based on the alternating-current voltage and an alternating-current current output from the power converter, wherein
the power generator simulation unit
calculates, for each power converter, a third difference between a predetermined impedance and the impedance of the converter transformer connected to the power converter, and generates a second angular frequency deviation for controlling the power converter, based on the third difference and the first angular frequency deviation, and
generates, for each power converter, the phase of the alternating-current voltage output from the power converter, based on the second angular frequency deviation corresponding to the power converter.

9. The electric power control system according to claim 8, wherein
the power generator simulation unit
generates, for each power converter, the second angular frequency deviation for controlling the power converter, by subtracting, from the first angular frequency deviation, a multiplied value obtained by multiplying the third difference corresponding to the power converter by a gain, and
generates the phase of the alternating-current voltage output from the power converter by time-integrating a sum of the second angular frequency deviation and a reference angular frequency.

10. The electric power control system according to claim 9, wherein
an interconnection transformer is disposed between a plurality of converter transformers connected to the plurality of power converters and a point of common coupling of the power system.

11. The electric power control system according to claim 8, wherein
an interconnection transformer is disposed between a plurality of converter transformers connected to the plurality of power converters and a point of common coupling of the power system.

12. The electric power control system according to claim 1, wherein
an interconnection transformer is disposed between a plurality of converter transformers connected to the plurality of power converters and a point of common coupling of the power system.

13. An electric power control system, comprising:
a plurality of power converters connected in parallel, wherein
each power converter, among the plurality of power converters, converts a direct-current power of an electricity storage device connected to the power converter into an alternating-current power, and outputs the alternating-current power to a power system via a converter transformer;
a power generator simulation unit to simulate characteristics of a synchronous generator, based on an active power output from the power converter, to generate a phase for an alternating-current voltage output from the power converter; and
a signal generation unit to generate a control signal for the power converter based on the phase of the alternating-current voltage for the power converter generated by the power generator simulation unit, wherein
the power generator simulation unit
calculates, for each power converter, an active power output from the power converter based on the alternating-current voltage and an alternating-current current output from the power converter, and
generates, for each power converter, the phase of the alternating-current voltage output from the power converter, based on the active power output from the power converter, a target value of the active power and an average of active powers output from the plurality of power converters.

14. The electric power control system according to claim 13, wherein
the power generator simulation unit
adds a difference between the active power output from the power converter and the average to a difference between the active power output from the power converter and the target value of the active power to calculate a first sum,
time-integrates the first sum to generate an angular frequency deviation, and
time-integrates a second sum of the angular frequency deviation and a reference angular frequency to generate the phase of the alternating-current voltage output from the power converter.

15. The electric power control system according to claim 13, wherein
the power generator simulation unit
time-integrates a difference between the active power output from the power converter and the target value of the active power to generate the first angular frequency deviation,
time-integrates a difference between the active power output from the power converter and the average to generate a second angular frequency deviation, and
time-integrates a sum of the first angular frequency deviation, the second angular frequency deviation, and a reference angular frequency to generate the phase of the alternating-current voltage output from the power converter.

16. The electric power control system according to claim 13, wherein
the power generator simulation unit
time-integrates a difference between the active power output from the power converter and the target value of the active power to generate a first angular frequency deviation,
time-integrates a sum of the first angular frequency deviation and a reference angular frequency to generate a first phase,
time-integrates a difference between the active power output from the power converter and the average to generate a second angular frequency deviation,
time-integrates the second angular frequency deviation to generate a second phase, and
adds the first phase and the second phase to generate the phase of the alternating-current voltage output from the power converter.

17. An electric power control system, comprising:
a plurality of power converters connected in parallel, wherein
each power converter, among the plurality of power converters, converts a direct-current power of an electricity storage device connected to the power converter into an alternating-current power, and outputs the alternating-current power to a power system via a converter transformer;
a power generator simulation unit to simulate characteristics of a synchronous generator, based on an active power output from the power converter, to generate a phase for an alternating-current voltage output from the power converter; and
a signal generation unit to generate a control signal for the power converter based on the phase of the alternating-current voltage for the power converter generated by the power generator simulation unit, wherein
the power generator simulation unit
time-integrates, for each power converter, a difference between the active power output from the power converter and a target value of the active power to generate an angular frequency deviation, and
generates, for each power converter, the phase of the alternating-current voltage output from the power converter, based on the angular frequency deviation corresponding to the power converter, a reference angular frequency, and an average of angular frequency deviations of the plurality of power converters.

18. The electric power control system according to claim 17, wherein
the power generator simulation unit time-integrates a sum of the angular frequency deviation corresponding to the power converter, a difference between the angular frequency deviation and the average, and the reference angular frequency to generate the phase of the alternating-current voltage output from the power converter.

19. An electric power control system, comprising:
a plurality of power converters connected in parallel, wherein
each power converter, among the plurality of power converters, converts a direct-current power of an electricity storage device connected to the power converter into an alternating-current power, and outputs the alternating-current power to a power system via a converter transformer;

a power generator simulation unit to simulate characteristics of a synchronous generator, based on an active power output from the power converter, to generate a phase for an alternating-current voltage output from the power converter; and a signal generation unit to generate a control signal for the power converter based on the phase of the alternating-current voltage for the power converter generated by the power generator simulation unit, wherein the power generator simulation unit
- time-integrates, for each power converter, a difference between the active power output from the power converter and the target value of the active power to generate an angular frequency deviation,
- calculates, for each power converter, a first phase by time-integrating the sum of the angular frequency deviation corresponding to the power converter and the reference angular frequency, and
- generates, for each power converter, the phase of the alternating-current voltage output from the power converter, based on the first phase corresponding to the power converter and an average of the first phases of the plurality of power converters.

20. The electric power control system according to claim 19, wherein the power generator simulation unit adds the first phase and a difference between the average and the first phase corresponding to the power converter to generate the phase of the alternating-current voltage output from the power converter.

* * * * *